United States Patent [19]

Buma et al.

[11] Patent Number: 5,119,297
[45] Date of Patent: Jun. 2, 1992

[54] HYDRAULIC ACTIVE SUSPENSION SYSTEM FOR A VEHICLE CAPABLE OF ENHANCING BOTH THE COMFORTABILITY AND THE CONTROLLABILITY OF THE ATTITUDE OF VEHICLE BODY

[75] Inventors: Shuuichi Buma, Toyota; Hiroyuki Ikemoto, Nagoya; Toshio Aburaya, Toyota; Takashi Yonekawa, Mishima; Kunihito Sato; Toshio Onuma, both of Susono; Kaoru Ohashi, Okazaki, all of Japan

[73] Assignee: Toyota Jidosha Kabushiki Kaisha, Aichi, Japan

[21] Appl. No.: 484,891

[22] Filed: Feb. 26, 1990

[30] Foreign Application Priority Data

Mar. 4, 1989 [JP] Japan ................................. 1-52298

[51] Int. Cl.⁵ ............................................. B60G 11/26
[52] U.S. Cl. ................................ 364/424.05; 280/707
[58] Field of Search ................. 364/424.05, 424.01; 280/707, 708

[56] References Cited

U.S. PATENT DOCUMENTS

| | | | |
|---|---|---|---|
| 4,830,397 | 5/1989 | Watanabe et al. | 280/707 |
| 4,887,840 | 12/1989 | Harara et al. | 280/707 |
| 4,898,257 | 2/1990 | Brandstadter | 180/9.1 |
| 4,949,262 | 8/1990 | Buma et al. | 364/424.05 |
| 4,969,662 | 11/1990 | Stuart | 280/707 |

FOREIGN PATENT DOCUMENTS

| | | |
|---|---|---|
| 0114757 | 1/1984 | European Pat. Off. . |
| 0236947 | 3/1987 | European Pat. Off. . |
| 0264944 | 10/1988 | European Pat. Off. . |
| 3408292 | 8/1985 | Fed. Rep. of Germany . |
| 62-187609 | 8/1987 | Japan . |
| 63-106127 | 5/1988 | Japan . |
| 63-106128 | 5/1988 | Japan . |
| 63-106129 | 5/1988 | Japan . |
| 63-258209 | 10/1988 | Japan . |
| 2-155814 | 6/1990 | Japan . |
| 2-155819 | 6/1990 | Japan . |
| WO8402886 | 8/1984 | PCT Int'l Appl. . |
| 1485003 | 8/1977 | United Kingdom . |

Primary Examiner—Thomas G. Black
Attorney, Agent, or Firm—Oliff & Berridge

[57] ABSTRACT

In a hydraulic active suspension system, a plurality of actuators having working fluid chambers are provided corresponding to vehicle wheels. Each actuator is adapted to increase or decrease vehicle height in response to the hydraulic pressure within its working fluid chamber. The hydraulic pressures within the working fluid chambers are controlled to their desired pressure by associated pressure control devices. A desired pressure computing device is further provided. The computing device calculates the actual values of roll, pitch, heave and warp of a vehicle body from the vehicle heights detected by detecting devices and calculates the differences between the actual values and the associated values of roll, pitch, heave and warp determined by a desired attitude of the vehicle body to compute the desired pressures for the actuators. The degrees of the roll and/or pitch differences are set to be higher than that of the warp difference in contributing to the determination of the desired pressures.

5 Claims, 20 Drawing Sheets

FIG. 9A

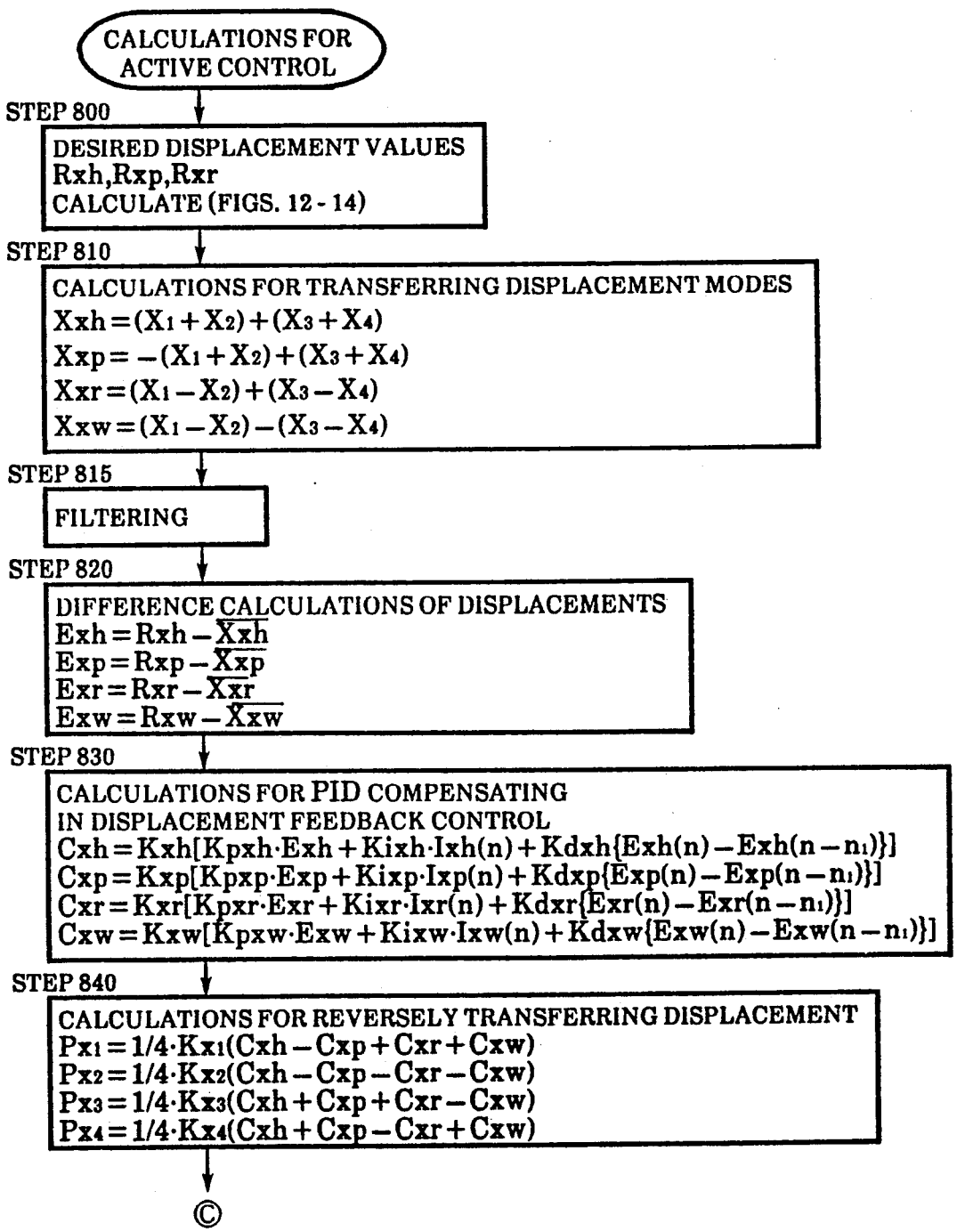

STEP 800 — CALCULATIONS FOR ACTIVE CONTROL

DESIRED DISPLACEMENT VALUES
$Rxh, Rxp, Rxr$
CALCULATE (FIGS. 12 - 14)

STEP 810 — CALCULATIONS FOR TRANSFERRING DISPLACEMENT MODES
$Xxh = (X_1 + X_2) + (X_3 + X_4)$
$Xxp = -(X_1 + X_2) + (X_3 + X_4)$
$Xxr = (X_1 - X_2) + (X_3 - X_4)$
$Xxw = (X_1 - X_2) - (X_3 - X_4)$

STEP 815 — FILTERING

STEP 820 — DIFFERENCE CALCULATIONS OF DISPLACEMENTS
$Exh = Rxh - \overline{Xxh}$
$Exp = Rxp - \overline{Xxp}$
$Exr = Rxr - \overline{Xxr}$
$Exw = Rxw - \overline{Xxw}$

STEP 830 — CALCULATIONS FOR PID COMPENSATING IN DISPLACEMENT FEEDBACK CONTROL
$Cxh = Kxh[Kpxh \cdot Exh + Kixh \cdot Ixh(n) + Kdxh\{Exh(n) - Exh(n - n_1)\}]$
$Cxp = Kxp[Kpxp \cdot Exp + Kixp \cdot Ixp(n) + Kdxp\{Exp(n) - Exp(n - n_1)\}]$
$Cxr = Kxr[Kpxr \cdot Exr + Kixr \cdot Ixr(n) + Kdxr\{Exr(n) - Exr(n - n_1)\}]$
$Cxw = Kxw[Kpxw \cdot Exw + Kixw \cdot Ixw(n) + Kdxw\{Exw(n) - Exw(n - n_1)\}]$

STEP 840 — CALCULATIONS FOR REVERSELY TRANSFERRING DISPLACEMENT
$Px_1 = 1/4 \cdot Kx_1(Cxh - Cxp + Cxr + Cxw)$
$Px_2 = 1/4 \cdot Kx_2(Cxh - Cxp - Cxr - Cxw)$
$Px_3 = 1/4 \cdot Kx_3(Cxh + Cxp + Cxr - Cxw)$
$Px_4 = 1/4 \cdot Kx_4(Cxh + Cxp - Cxr + Cxw)$

Ⓒ

HYDRAULIC ACTIVE SUSPENSION SYSTEM FOR A VEHICLE CAPABLE OF ENHANCING BOTH THE COMFORTABILITY AND THE CONTROLLABILITY OF THE ATTITUDE OF VEHICLE BODY

BACKGROUND OF THE INVENTION

1. Field of the Invention

The present invention relates to a hydraulic active suspension system for a vehicle such as an automobile or the like, and, more particularly, relates to a hydraulic active suspension system which is improved to enhance the comfortability of a vehicle while effectively controlling the attitude change of a vehicle body.

2. Prior Art

As described, for example, in Japanese Patent Laying Open Publication No. 62-187609 (1987), as one of active suspension systems for a vehicle such as an automobile or the like, a hydraulic active suspension system has already been known which comprises a plurality of hydraulic actuators each being provided corresponding to vehicle wheels and adapted to increase or decrease the vehicle height in response to the hydraulic pressure within its working fluid chamber, and a plurality of control means each being provided corresponding to the actuators and adapted to control the pressure within the working fluid chamber in each actuator to a desired pressure which is determined based upon the difference between a desired and an actual vehicle heights. According to the hydraulic active suspension system of this type, the attitude change of the vehicle body can be performed in a more effective manner as compared with the system in which no feedback control is conducted based upon the vehicle height difference.

In such a hydraulic active suspension system as mentioned above, however, in which the actuator and the control means for controlling the hydraulic pressure within the associated actuator are provided for each vehicle wheel, and the feedback control based upon the vehicle height difference is carried out separately for each vehicle wheel, if the feedback controls are performed to a larger extent so as effectively to reduce the attitude change of the vehicle body such as roll and pitch, the desired pressures may considerably be varied in response to the change in vehicle height due to the undulations of a road surface. In contrast with this, if the effectiveness of the feedback controls is reduced so as to ensure the comfortability of the vehicle, the hydraulic pressure within each actuator may not always be effectively controlled and the attitude change of the vehicle body may not desirably be controlled.

SUMMARY OF THE INVENTION

The present invention takes into consideration the problem associated with the above described conventional hydraulic active suspension system in which the feedback control based upon the vehicle height difference is carried out separately for each vehicle wheel, and it has as its object the provision of a hydraulic active suspension system which is improved to enhance the comfortability of the vehicle while effectively controlling the attitude change of the vehicle body.

The above mentioned object is accomplished, according to the present invention, by a hydraulic active suspension system for a vehicle having a vehicle body and vehicle wheels comprising:

a plurality of actuators provided between said vehicle body and said associated vehicle wheels and adapted to increase and decrease vehicle heights in response to the hydraulic pressures within their working fluid chambers being controlled;

a means for controlling the hydraulic pressures within said working fluid chambers to their desired pressures;

means for detecting vehicle heights at the locations corresponding to said vehicle wheels; and a means for calculating the actual values of roll, pitch, heave and warp of said vehicle body from the vehicle heights detected by said detecting means and calculating the differences between said actual values and the associated values of roll pitch, heave and warp determined by a desired attitude of said vehicle body to compute the desired pressures for said actuators;

wherein said computing means is at least so adapted that the degrees of the roll and/or pitch differences are higher than that of the warp difference in contributing to the computation of the desired pressures, or a hydraulic active suspension system for a vehicle having a vehicle body and vehicle wheels comprising:

a plurality of actuators provided between said vehicle body and said associated vehicle wheels and adapted to increase and decrease vehicle heights in response to the hydraulic pressures within their working fluid chambers being controlled;

a means for controlling the hydraulic pressures within said working fluid chambers to their desired pressures;

means for detecting vehicle heights at the locations corresponding to said vehicle wheels; and a means for calculating the actual values of roll, pitch and heave of said vehicle body from the vehicle heights detected by said detecting means and calculating the differences between said actual values and the associated values of roll, pitch and heave determined by a desired attitude of said vehicle body to compute the desired pressures for said actuators.

According to the above mentioned former construction of the present invention, the differences are calculated which are between the actual values of roll, pitch, heave and warp of the vehicle body calculated from the actual vehicle heights detected and the associated values of roll, pitch, heave and warp determined by a desired attitude of the vehicle body to compute desired pressures for the actuators based upon the differences, and at least the degrees of the roll and/or pitch differences are set to be higher than that of the warp difference in contributing to the computation of the desired pressures. Accordingly, as compared with the conventional active suspension system in which the feedback control based upon the vehicle height difference is carried out separately at each vehicle wheel, the system can more effectively reduce the attitude change of the vehicle body without compromising the comfortability of the vehicle to a larger extent and, conversely, can effectively control the attitude change of the vehicle body even though the comfortability is highly estimated, thereby enhancing both the controllability of the attitude change of the vehicle body and the comfortability of the vehicle.

In this connection, it is to be understood that the expression that the degrees of the roll and/or pitch differences are higher than that of the warp difference in contributing to the computation of the desired pressures, means that for the differences having the same quantities the influence of the roll and/or pitch differences is higher than that of the warp difference in computing the desired pressures.

According to the above mentioned latter construction of the present invention, the differences are calculated which are between the actual values of roll, pitch and heave of the vehicle body calculated from the actual vehicle heights detected and the associated values of roll, pitch and heave determined by a desired attitude of the vehicle body to compute desired pressures for the actuators based upon the differences, to which the hydraulic pressures within the working fluid chambers in the actuators are controlled and the hydraulic pressures are not controlled based upon warp difference. Accordingly, as compared with the conventional active suspension system, the system can also more effectively reduce the attitude change of the vehicle body without compromising the comfortability of the vehicle to a larger extent and, conversely, can effectively control the attitude change of the vehicle body even though the comfortability is highly estimated.

According to an aspect of the present invention, the desired pressures are computed as direct proportional to the roll, pitch, heave and warp differences and the proportional constant for the roll or pitch difference is set to be higher than that for the warp difference.

According to another aspect of the present invention, the desired pressures are computed as direct proportional to the roll, pitch, heave and warp differences and the proportional constants for the roll and pitch differences are set to be higher than that for the warp difference.

According to yet another aspect of the present invention, computing means is adapted to process the roll, pitch, heave and warp differences with associated low-pass filters, and the cut-off frequency of the filter for the roll or pitch difference is set to be higher than that of the filter for the warp difference.

According to yet another aspect of the present invention, the computing means is adapted to process the roll, pitch, heave and warp differences with associated low-pass filters, and the cut-off frequencies of the filters for said roll and pitch differences are set to be higher than that of the filter for said warp difference.

The present invention is now described in terms of preferred embodiments thereof with reference to the attached drawings.

BRIEF DESCRIPTION OF THE DRAWINGS

In the accompanying drawings:

FIGS. 9A through 9C are flow charts showing the subroutine of the calculations for the active control carried out in the step 150 in the flow chart shown in FIG. 3;

DESCRIPTION OF THE PREFERRED EMBODIMENTS

Figure 1:
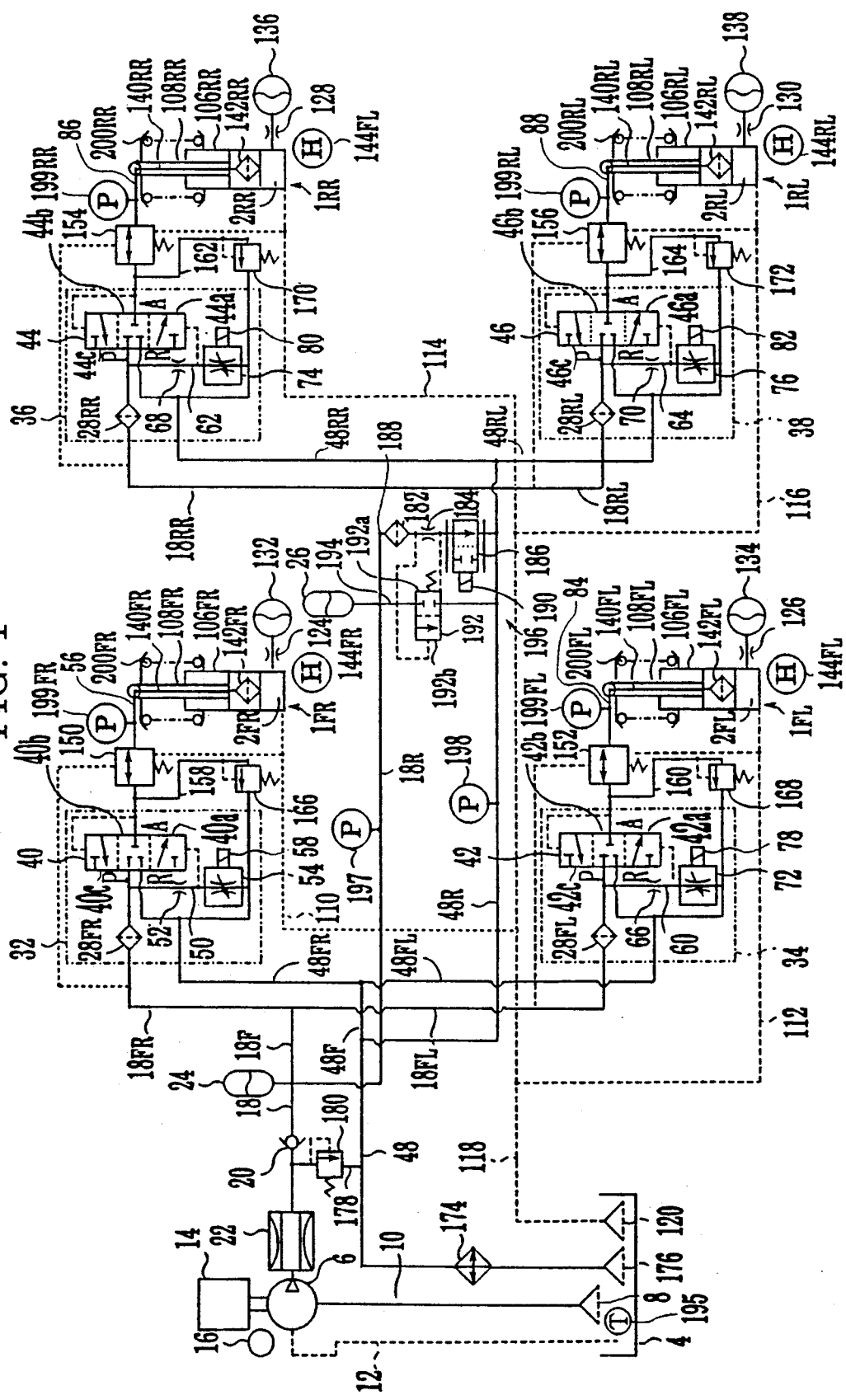
FIG. 1 is a schematic diagram showing major physical components of the preferred embodiment of the hydraulic active suspension system for a vehicle according to the present invention.

Referring to the drawings, FIG. 1 is a schematic diagram showing major physical components of the preferred embodiment of the hydraulic active suspension system of the present invention. The suspension system shown in FIG. 1 includes actuators 1FR, 1FL, 1RR and 1RL provided corresponding to front right, front left, rear right and rear left vehicle wheels, not shown, respectively, and these actuators have therein working fluid chambers 2FR, 2FL, 2RR, and 2RL, respectively.

In the Figure, 4 designates a reserve tank which contains oil serving as working fluid, and the tank 4 is fluidly connected to the suction side of a pump 6 by a suction flow line 10 having therein a filter 8 for removing any foreign matter from oil. To the pump 6 is connected a drain line 12 which collects the oil leaking within the pump and returns it to the reserve tank 4. The pump 6 is drivingly connected with and rotationally driven by an engine 14, the rotational speed of which is detected by a rotational speed sensor 16.

A high pressure flow line 18 is connected with the discharge side of the pump 6. A check valve 20 is incorporated in the high pressure flow line 18, which permits only the flow of oil in the direction from the pump towards the actuators, and between the pump 6 and the check valve 20 is provided an attenuator 22 which serves to absorb or dampen the pressure pulsation of the oil discharged from the pump, thereby reducing the pressure variation. The high pressure flow line 18 is connected with one ends of a high pressure flow line 18F for the front vehicle wheels and a high pressure flow line 18R for the rear vehicle wheels, with which are connected accumulators 24 and 26, respectively. These accumulators contain therein pressurized gas and serve to absorb pressure variation of the oil and to accumulate pressure. A high pressure flow line 18FR for the front right vehicle wheel and a high pressure flow line 18FL for the front left vehicle wheel are connected at their one ends with the high pressure flow line 18F, while a high pressure flow line 18RR for the rear right vehicle wheel and a high pressure flow line 18RL for the rear left vehicle wheel are connected at their one ends with the high pressure flow line 18R. The high pressure flow lines 18FR, 18FL, 18RR and 18RL have therein filters 28FR, 28FL, 28RR and 28RL, respectively, and lines are connected at their other ends with ports P of pilot-operated three-port switching control valves 40, 42, 44 and 46 included in pressure control valves 32, 34, 36 and 38, respectively.

The pressure control valve 32 comprises the switching control valve 40, a flow line 50 fluidly communicating the high pressure flow line 18FR and a low pressure flow line 48FR for the front right vehicle wheel with each other, a fixed flow restriction 52 and a variable flow restriction 54 both provided in the flow line 50. The switching control valve 40 has, in addition to the port P, ports R and A which are connected with low pressure flow line 48FR and a connecting flow line 56, respectively. The switching control valve 40 may be a spool type valve adapted to take in as pilot pressures the pressure Pp within the flow line 50 between the flow restrictions 52 and 54 and the pressure Pa within the connecting flow line 56, and to be shifted to a switching position 40a wherein it fluidly communicates the ports P and A with each other when the pressure Pp is substantially higher than the pressure Pa; a switching position 40b wherein it cuts the communication among the all the ports when the pressure Pp and Pa are substantially equal to each other; and a shifting position 40c wherein it fluidly communicates the ports R and A with each other when the pressure Pp is substantially lower than the pressure Pa. The variable flow restriction 54 is adapted to vary its effective flow area by means of the electric current supplied to its solenoid 58 being controlled and to cooperate with the fixed flow restriction 52 to variably control the pilot pressure Pp.

Similarly, the pressure control valves 34, 36 and 38 comprise pilot-operated, three-port switching control valves 42, 44 and 46 corresponding to the valve 40, flow lines 60, 62 and 64 corresponding to the flow line 50, fixed flow restrictions 66, 68 and 70 corresponding to the flow restriction 52, and variable flow restriction 72, 74 and 76 corresponding to the flow restriction 54, respectively. The variable flow restrictions 72, 74 and 76 have solenoids 78, 80 and 82, respectively, corresponding to the solenoid 58.

The switching control valves 42, 44 and 46 have the same construction as the switching valve 40, and have the ports R connected with one ends of a low pressure flow line 48FL for front left vehicle wheel, a low pressure flow line 48RR for rear right vehicle wheel, and a low pressure flow line 48RL for rear left vehicle wheel, respectively, and the ports A connected with one ends of connecting flow lines 84, 86 and 88, respectively. The switching valves 42, 44 and 46 are spool type valves adapted to take in as pilot pressures the pressures Pp within the associated flow lines 60, 62 and 64 between the associated fixed and the variable flow restrictions and the pressures Pa within the associated flow lines 84, 86 and 88, and to be shifted to switching positions 42a, 44a and 46a, respectively, wherein they fluidly communicate the ports P and A with each other when the pressures Pp are substantially higher than the pressures Pa; shifting positions 42b, 44b and 46b wherein they shut the communications among the all the ports when the pressures Pp and Pa are substantially equal to each other; and shifting positions 42c, 44c and 46c wherein they fluidly communicate the ports R and A with each other when the pressures Pp are substantially lower than the pressures Pa.

As is schematically shown in FIG. 1, the actuators 1FR, 1FL, 1RR and 1RL include cylinders 106FR, 106FL, 106RR and 106RL defining the working fluid chambers 2FR, 2FL, 2RR and 2RL and pistons 108FR, 108FL, 108RR and 108RL, respectively, which are reciprocally inserted into the associated cylinders. While in the embodiment shown, the actuators are located between a vehicle body, not shown, and associated suspension arms, also not shown, with each cylinder being coupled to the associated suspension arm and the upper extremity of the rod portion of each piston being coupled to the vehicle body, each cylinder may be coupled to the vehicle body and each piston may be coupled the associated suspension arm. Drain flow lines 110, 112, 114 and 116 are fluidly connected at their one ends with the cylinders 106FR, 106FL, 106RR and 106RL, respectively, of the actuators. The other ends of the drain lines 110, 112, 114 and 116 are connected with a drain flow line 118, which is in turn connected with the reserve tank 4 by way of a filter 120 so that the oil leaking from the working fluid chambers may be returned into the tank.

To the working fluid chambers 2FR, 2FL, 2RR and 2RL are connected accumulators 132, 134, 136 and 138, respectively, serving as hydropneumatic springs by way of flow restrictions 124, 126, 128 and 130, respectively. The pistons 108FR, 108FL, 108RR and 108RL have therein flow lines 140FR, 140FL, 140RR and 140RL, respectively. These flow lines fluidly connect the associated flow lines 56, 84, 86 and 88 and the associated working fluid chambers 2FR, 2FL, 2RR and 2RL with each other, and have therein filters 142FR, 142FL, 142RR and 142RL, respectively. At the locations adjacent to the actuators 1FR, 1FL, 1RR and 1RL are installed vehicle height sensors 144FR, 144FL, 144RR and 144RL, respectively, which detect the vehicle heights at the locations corresponding to the associated vehicle wheels.

The connecting flow lines 56, 84, 86 and 88 have therein pilot-operated cut-off valves 150, 152, 154 and 156, respectively, which are adapted to retain their closed positions whenever the pressure differences between the pressures within the high pressure flow lines 18FR, 18FL, 18RR and 18RL upstream of the associated pressure control valves 40, 42, 44 and 46, respectively, and the pressures within the drain flow lines 110, 112, 114 and 116, respectively, are not more than predeterminate values, and to increase their opening degree with the increase in the pressure differences in the range where the differences exceed the predeterminate values. The flow lines 56, 84, 86 and 88 are connected between the associated pressure control valves and the cut-off valves with the flow line 50, 60, 62 and 64 in the pressure control valves on the downstream side of the associated variable flow restrictions by flow lines 158, 160, 162 and 164, respectively. The flow lines 158, 160, 162 and 164 have therein relief valves 166, 168, 170 and 172, respectively, which are adapted to take in as pilot pressures the pressures within the associated flow lines 158, 160, 162 and 164, respectively, upstream thereof, i.e., on the side of the associated connecting flow lines, and to open when the pilot pressures exceed predeterminate values to thereby conduct some oil within the connecting flow lines to the flow lines 50, 60, 62 and 64.

As will be realized, the cut-off valves 150, 152, 154 and 156 may be adapted to retain their closed positions whenever the differences between the pressures within the high pressure flow lines 18FR, 18FL, 18RR and 18RL and the atmospheric pressure are not more than predeterminate values.

The flow lines 48FR and 48FL are connected at their other ends with one end of a low pressure flow line 48F for the front vehicle wheels, while the flow lines 48RR and 48RL are connected at their other ends with one end of a low pressure flow line 48R for the rear vehicle wheels. The flow lines 48F and 48R are connected at their other ends with one end of a low pressure flow line 48. The flow line 48 has therein an oil cooler 174 and is connected at the other end with the reserve tank 4 by way of a filter 176. The high pressure flow line 18 is fluidly connected at a position between the check valve 20 and the attenuator 22 with the low pressure flow line 48 by a flow line 178. The flow line 178 has therein a relief valve 180 which is adapted to open when its pilot pressure is more than a predeterminate value.

The high pressure flow line 18R and the low pressure flow line 48R are connected with each other by a flow line 188 which has therein a filter 182, a flow restriction 184 and a normally open electromagnetic on-off valve 186 including a solenoid 190 for adjusting the valve opening. The on-off valve 186 is adapted to open when its solenoid 190 is energized and to control the flow rate of the oil flowing therethrough when the energizing electric current is adjusted. The high pressure flow line 18R and the low pressure flow line 48R are additionally connected with each other by a flow line 194 which have therein a pilot-operated on-off valve 192. The on-off valve 192 is adapted to take in as pilot pressures the pressures on both sides of the flow restriction 184 and to remain in its closed position 192a when no substantial pressure difference exists between the pressures on both sides of the flow restriction 184 and to be switched over to its open position 192b when the pressure on the side of the high pressure flow line 18R relative to the flow restriction 184 is substantially higher than the pressure on the side of the low pressure flow line. Thus, the flow restriction 184, the electromagnetic on-off valve 186 and the on-off valve 192 cooperate with each other to define a bypass valve 196 which selectively communicates the high pressure flow line 18R and the low pressure flow line 48R with each other, and controls the flow rate of the oil flowing from the high pressure flow line to the low pressure flow line.

Further in the embodiment shown, a pressure sensor 197 is connected to the high pressure flow line 18R for detecting the oil pressure Ps within the flow line and similarly a pressure sensor 198 is connected to the low pressure flow line 48R for detecting the oil pressure Pd within the flow line. Pressure sensors 199FR, 199RL, 199RR and 199RL are connected to the connecting flow lines 56, 84, 86 and 88 for detecting the oil pressure within the working fluid chambers 2FR, 2RL, 2RR and 2RL, respectively. A temperature sensor 195 is provided in the reserve tank 4 for detecting the temperature T of the oil within the tank. Compression coil springs 200FR, 200RL, 200RR and 200RL serving as suspension spring are interposed between upper sheets attached to the rod portions of the pistons 108FR, 108RL, 108RR and 108RL incorporated in the actuators and lower sheets secured to the cylinders 106FR, 106RL, 106RR and 106RL, respectively.

Figure 2:
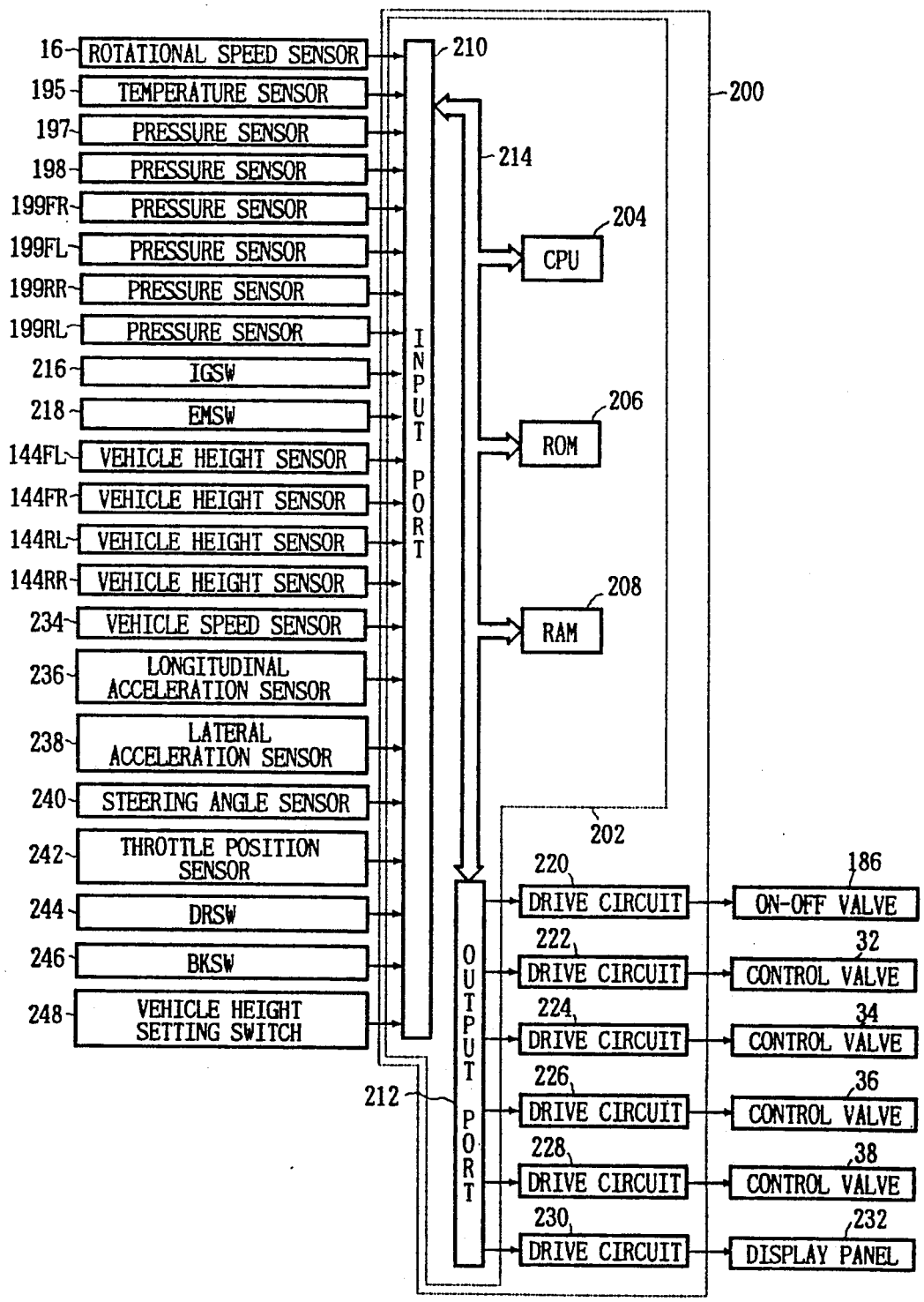
FIG. 2 is a block diagram showing an electric control device of the embodiment shown in FIG. 1.

The electromagnetic on-off valve 186 and the pressure control valves 32, 34, 36 and 38 are controlled by an electric control device 200 shown in FIG. 2. The electric control device 200 includes a microcomputer 202. The microcomputer 202 may, as shown in FIG. 2, be of conventional construction having a CPU (central processing unit) 204, a ROM (read only memory) 206, a RAM (random access memory) 208, an input port device 210, and an output port device 212, all of these being linked with each other by a two way common bus 214.

The input port device 210 is supplied with a signal indicative of the rotational speed N of the engine 14 from the rotational speed sensor 16, a signal indicative of the temperature T of the oil from the temperature sensor 195, signals indicative of the pressures Ps and Pd within the high pressure and the low pressure flow lines from the pressure sensors 197 and 198, respectively, signals indicative of the pressures Pi (where "i" is "1" for the front left wheel, "2" for the front right wheel, "3" for the rear left wheel, and "4" for the rear right wheel) within the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, a signal indicative of whether or not an emergency switch (EMSW) 218 is on which is provided in a cabin and is operated by a driver or a passenger, and signals indicative of the vehicle heights $X_i$ ($i=1, 2, 3$ and 4) at locations corresponding to the front left wheel, the front right wheel, the rear left wheel, and the rear right wheel from the vehicle height sensors 144FL, 144FR, 144RL and 144RR, respectively.

Additionally the input port device 210 is supplied with a signal indicative of a vehicle speed V from a vehicle speed sensor 234, a signal indicative of a longitudinal acceleration Ga from a longitudinal acceleration sensor 236, a signal indicative of a lateral acceleration Gl from a lateral acceleration sensor 238, a signal indicative of a steering angle $\theta$ from a steering angle sensor 240, a signal indicative of a throttle opening Ba from a throttle position sensor 242, a signal indicative of whether or not an idle switch (IDSW) 244 is on from the idle switch, a signal indicative of whether or not a brake switch (BKSW) 246 is on from the brake switch, and a signal indicative of whether the mode for controlling the vehicle height set by a vehicle height setting switch 248 is a high mode or a normal mode. The switch 248 is provided in the cabin to be operated by a driver or a passenger according to his or her taste.

The input port device 210 processes the signals input thereinto in a predetermined manner and, under the control of the CPU 204 which is based upon the program stored in the ROM 206, outputs the processed signals to the CPU and the RAM 208. The ROM 206 stores the control flows shown in FIG. 3, FIGS. 8A through 8C and FIGS. 9A through 9C, and the maps shown in FIGS. 4 through 7 and FIGS. 10 through 16. The CPU processes the signals in accordance with flow charts referred to later and conducts filtering explained later. The output port device 212, under the control of the CPU 204, outputs a control signal via a drive circuit 220 to the electromagnetic on-off valve 186 and control signals via drive circuits 222, 224, 226 and 228 to the pressure control valves 32, 34, 36 and 38, to be more exact, to the solenoids 58, 78, 80 and 82 in the variable flow restrictions 54, 72, 74 and 76, respectively, and a control signal via a drive circuit 230 to a display panel 232.

Figure 3:
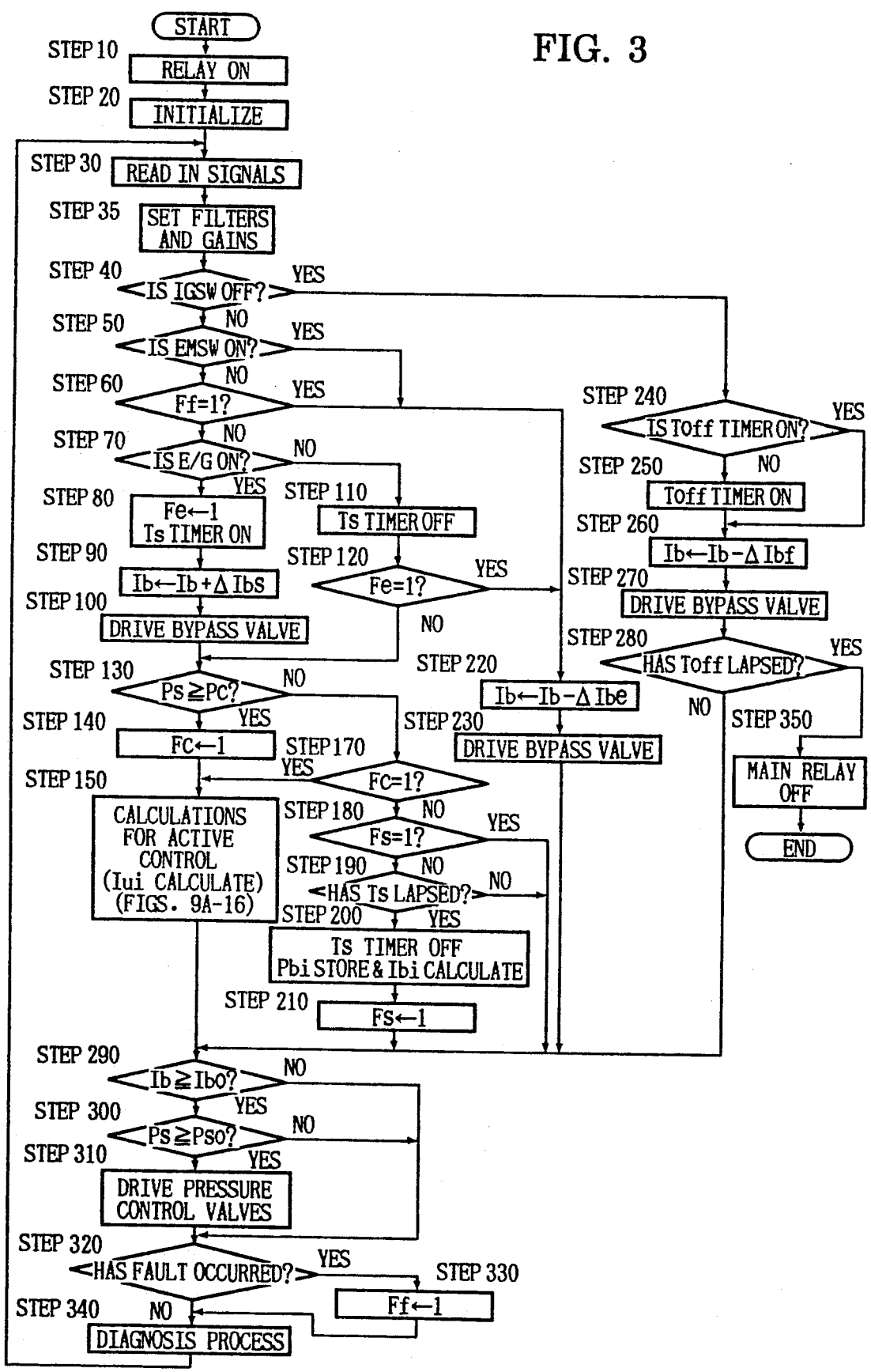
FIG. 3 is a flow chart showing a control flow of a cyclical program carried out by the electric control device shown in FIG. 2.

Referring now to the flow chart shown in FIG. 3, the operation of the embodiment is explained.

In this connection, it is to be noted that the routine of the control flow shown in FIG. 3 is initiated when the ignition switch 216 is turned on. It should also be noted that in the flow chart shown in FIG. 3, a flag Ff concerns whether or not any fault or faults exist anywhere in the hydraulic suspension system and one means that any fault or faults have occurred in the hydraulic suspension system; a flag Fe is concerned with whether or not the engine is running and one means that the engine is running; a flag Fc relates to whether or not the pressure Ps of the oil within the high pressure flow line has ever exceeded a threshold pressure Pc above which the cut-off valves 152, 150, 156 and 154 are completely opened and one means that the pressure Ps has ever exceeded the pressure Pc; and a flag Fs is related to whether or not standby pressures Pbi (i=1, 2, 3 and 4) referred to later have been set for the pressure control valves 34, 32, 38 and 36, and one means that the standby pressures have been set.

In the first step 10, a main relay not shown in the figures is turned on, and then the flow of control passes next to the step 20.

In the step 20, the RAM 208 is cleared of all the information stored therein and all the flags are reset to zero, and then the flow of control passes to the next step 30.

In the step 30, are read in the signal indicative of the rotational speed N of the engine 14 detected by the rotational speed sensor 16, the signal indicative of the temperature T of the oil detected by the temperature sensor 195, signals indicative of the pressures Ps and Pd within the high pressure and the low pressure flow line detected by the pressure sensors 197 and 198, respectively, the signals indicative of the pressures Pi within the working fluid chambers 2FL, 2FR, 2RL and 2RR detected by the pressure sensors 199FL, 199FR, 199RL and 199RR, the signal indicative of whether or not the ignition switch 216 is on, the signal indicative of whether or not the emergency switch 218 is on, the signals indicative of the vehicle heights Xi detected by the vehicle height sensors 144FL, 144FR, 144RL and 144RR, the signal indicative of the vehicle speed V detected by the speed sensor 234, the signal indicative of the longitudinal acceleration Ga detected by the longitudinal acceleration sensor 236, the signal indicative of the lateral acceleration Gl detected by the lateral acceleration sensor 238, the signal indicative of the steering angle $\theta$ detected by the steering angle sensor 240, the signal indicative of the throttle opening $\theta a$ detected by the throttle position sensor 242, the signal indicative of whether or not the door switch 244 is on, the signal indicative of whether or not the brake switch 246 is on, and the signal indicative of whether the mode for controlling the vehicle height set by the vehicle height setting switch 248 is the high mode or the normal mode, and then the flow of control passes next to the step 35.

In the step 35, as will be explained in detail later referring to FIGS. 8A through 8C, based upon the signals read in the step 30, the low-path filters utilized in the filtering carried out in the step 815 in the flow charts shown in FIGS. 9A through 9C and the gains Kxp, Kxr and Kxw in the equations utilized in the calculations performed in the step 830 are set to their high or low levels, and the gain Kxh is set to its high, normal or low level, and the flow of control passes next to the step 40.

In this connection, the "high" and "low" levels for the filters mean that the cut-off frequency for filtering is high and low, respectively. For example, in the following basic equation for a low-pass filter:

$$J(n) = \{Kf \cdot I(n) + (C - Kf) \cdot J(n-1)\}/C$$

where I(n) is a present value, J(n−1) is the result of the filtering conducted one cycle before, and C is a constant, setting a filter to its high and low levels may be carried out by setting Kf at high and low values, respectively. The "high" and "low" levels for the gains mean that the values of the gains per se are high and low, respectively.

In the step 40, a decision is made as to whether or not the ignition switch is off. If a decision is made that the ignition switch is off, then the flow of control is transferred to the step 240, and if a decision is made that the ignition switch is on, then the flow of control passes next to the step 50.

In the step 50, a decision is made as to whether or not the emergency switch is on. If the a decision is made that the emergency switch is on, then the flow of control is transferred to the step 220, and if a decision is made that the emergency switch is not on, then the flow of control passes next to the step 60.

In the step 60, a decision is made as to whether or not the flag Ff is one. If a decision is made that the flag Ff is one, then the flow of control is transferred to the step 220, and if a decision is made that the flag Ff is not one, then the flow of control proceeds to the next step 70.

In the step 70, a decision is made as to whether or not the engine is running by determining whether or not the rotational speed N of the engine which was detected by the rotational speed sensor 16 and read in the step 30 is more than a predeterminate value. If a decision is made that the engine is not running, then the flow of control is transferred to the step 110, and if a decision is made that the engine is running, then the flow of control passes next to the step 80.

It is to be understood that the decision as to whether or not the engine is running may be made by, for example, determining whether or not the voltage of the electricity generated by an alternator, not shown, which is driven by the engine is higher than a predeterminate value.

In the step 80, the flag Fe is set to one, and a timer is started which counts the period of time Ts between the time point when the engine is started and the time point when the standby pressures Pbi are set for the pressure control valves 34, 32, 38 and 36 in the step 200 referred to later, and then the flow of control passes next to the step 90. In the event, however, where the flag Fe has already been set to one, it is left as it is, and in the case where the timer has already been operated, it continues to count.

Figure 4:
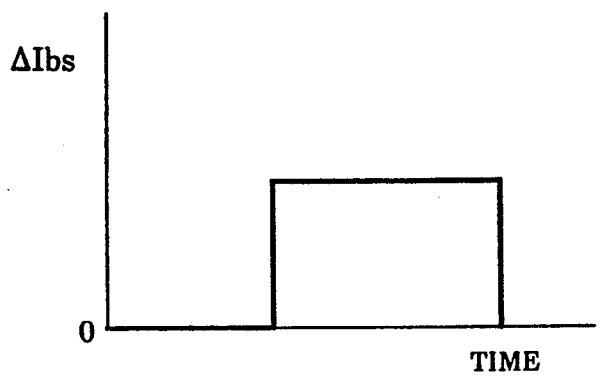
FIGS. 4 through 6 are graphs showing the maps utilized in calculating the electric current Ib which is supplied to the bypass valve at the stage when the control system is started, when the control system is stopped under a normal operational condition, and when the system is stopped under an abnormal operational condition, respectively.

In the step 90, electric current Ib which is supplied to the solenoid 190 within the electromagnetic on-off valve 186 included in the bypass valve 196 is calculated based upon the map stored in ROM 206 which corresponds to the graph shown in FIG. 4 according to the following equation, and then the flow of control passes next to the step 100.

$$Ib = Ib + delta\ Ibs$$

In the step 100, the electric current Ib calculated in the step 90 is supplied to the solenoid 190 in the electromagnetic on-off valve 186 to shift the bypass valve 196 toward its fully closed position, and then the flow of control proceeds to the next step 130.

In the step 110, the Ts timer is stopped, and then the flow of control passes next to the step 120. In the event, however, where the Ts timer is not operated, it is left as it is.

In the step 120, a decision is made as to whether or not the flag Fe is one. If a decision is made that the flag Fe is one, i.e., the engine has been stopped after it was once started, then the flow of control is transferred to the step 220, and if a decision is made that the flag Fe is not one, i.e., the engine has not yet been started, then the flow of control passes next to the step 130.

In the step 130, a decision is made as to whether or not the pressure Ps within the high pressure flow line is equal to or more than the threshold value Pc. If a decision is made that Ps is not equal to or is not higher than Pc, then the flow of control is transferred to the step 170, and if a decision is made that Ps is equal to or higher than Pc, then the flow of control passes next to the step 140.

In the step 140, the flag Fc is set to one, and next the flow of control passes to the step 150.

In the step 150, as will be explained in detail later referring to FIGS. 9A through 9C and FIGS. 10 through 16, in order to control the comfortability of the vehicle and the attitude of the vehicle body, the calculations for active controls are performed based upon the data read in the step 30 to calculate the electric currents Iui which are supplied to the solenoids 78, 58, 82 and 80 incorporated within the variable flow restrictions 72, 54, 76 and 74 in the pressure control valves, and then the flow of control is transferred to the step 290.

In the step 170, a decision is made as to whether or not the flag Fc is one. If a decision is made that the flag Fc is one, i.e., the pressure Ps of the oil within the high pressure flow line has been decreased to a level lower than the threshold pressure Pc after it was increased to a level equal to or higher than the threshold value, then the flow of control passes to the step 150, and if a decision is made that the flag Fc is not one, i.e., the pressure Ps has not yet been increased to a level equal to or higher than the threshold pressure Pc, then the flow of control passes next to the step 180.

In the step 180, a decision is made as to whether or not the flag Fs is one. If a decision is made that the flag Fs is one, then the flow of control passes to the step 290, and if a decision is made that the flag Fs is not one, then the flow of control passes next to the step 190.

In the step 190, a decision is made as to whether or not the time Ts has elapsed. If a decision is made that the time Ts has not yet elapsed, then the flow of control passes to the step 290, and if a decision is made that the time Ts has elapsed, then the flow of control passes next to the step 200.

Figure 7:
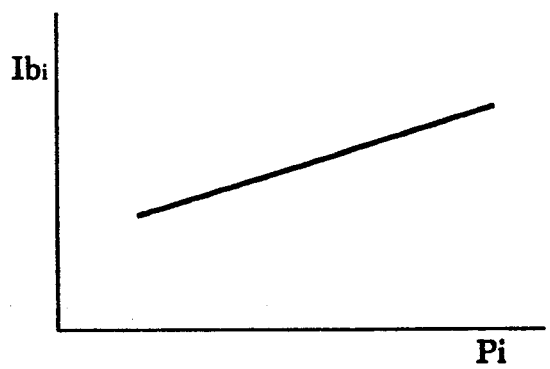
FIG. 7 is a graph showing the relationship between the pressures Pi within the working fluid chambers in the actuators and the electric currents Ibi supplied to the pressure control valves.

In the step 200, the Ts timer is stopped, and according to the map stored in the ROM 206 which corresponds to the graph shown in FIG. 7, the values of the electric currents Ibi (i=1, 2, 3 and 4) are calculated which are supplied to the solenoids 78, 58, 82 and 80 incorporated within the variable flow restrictions 72, 54, 76 and 74 in the pressure control valves 34, 32, 38 and 36 so that the pressures within the connecting flow lines 84, 56, 88 and 86 between the associated pressure control valves and the associated cut-off valves may be controlled to the respective standby pressures Pbi, i.e., the pressures which are substantially equal to the pressures Pi within the working fluid chambers 2FL, 2FR, 2RL and 2RR that are detected by the associated pressure sensors, and then the flow of control passes next to the step 210.

In the step 210, the flag Fs is set to one, and then the flow of control is transferred to the step 290.

Figure 6:
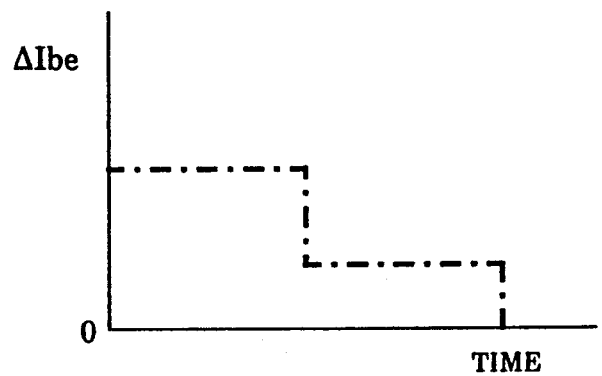

In the step 220, based upon the map which corresponds to the graph shown in FIG. 6 and is stored in the ROM 206, the electric current Ib which is supplied to the solenoid 190 incorporated within the electromagnetic on-off valve 186 included in the bypass valve 196 is calculated according to the following equation, and then the flow of control passes next to the step 230.

$$Ib = Ib - delta\ Ibe$$

In the step 230, the electric current Ib calculated in the step 220 is supplied to the solenoid 190 to shift the bypass valve 196 towards its full open position, and then the flow of control is transferred to the step 290.

In the step 240, a decision is made as to whether or not a timer is on which concerns the period of time Toff, between the time point when the ignition switch is turned off and the time point when the main relay is switched off. If a decision is made that the Toff timer is on, then the flow of control passes next to the step 260, and if a decision is made that the Toff timer is not on, then the flow of control passes next to the step 250.

In the step 250, the Toff timer is started to count, and then the flow of control passes next to the step 260.

Figure 5:
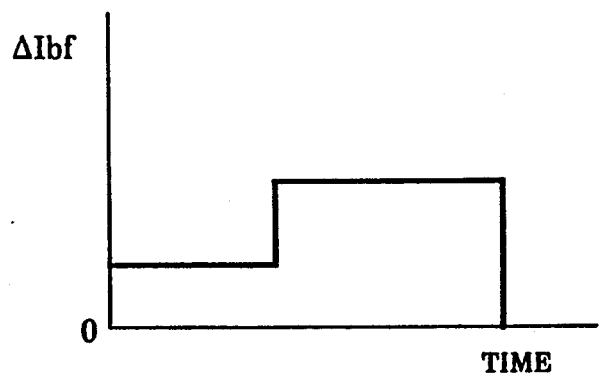

In the step 260, based upon the map which corresponds to the graph shown in FIG. 5 and is stored in the ROM 206, the electric current Ib which is supplied to the solenoid 190 incorporated in the electromagnetic on-off valve 186 is calculated according to the following equation, and then the flow of control proceeds to the next step 270.

$$Ib = Ib - delta\ Ibf$$

In the step 270, the electric current Ib calculated in the step 260 is supplied to the solenoid 190 in the electromagnetic on-off valve 186 to shift the bypass valve 196 towards its full open position, and then the flow of control passes next to the step 280.

In the step 280, a decision is made as to whether or not the time Toff has elapsed. If a decision is made that the time Toff has elapsed, then the flow of control is transferred to the step 350, and if a decision is made that the time Toff has not yet elapsed, then the flow of control passes to the next step 290.

In the step 290, a decision is made as to whether or not the electric current Ib calculated in the step 90, 220 or 260 is not less than a reference value Ibo. If a decision is made that the current Ib is less than Ibo, then the flow of control is transferred to the step 320, and if a decision is made that the current Ib is not less than Ibo, then the flow of control passes next to the step 300.

In the step 300, a decision is made as to whether or not the pressure Ps within the high pressure flow line read in the step 30 is not less than a reference value Pso which is lower than the threshold value Pc. If a decision is made that Ps is less than Pso, then the flow of control passes to the step 320, and if a decision is made that Ps is not less than Pso, then the flow of control passes next to the step 310.

In the step 310, the electric currents Ibi calculated in the step 200 or the electric currents Iui calculated in the step 150 are supplied to the solenoid 78, 58, 82 and 80 incorporated in the variable flow restrictions included in the associated pressure control valves so that the valves are driven to adjust the pressures within the working fluid chambers in the associated actuators, and the flow of control proceeds to the next step 320.

In the step 320, a decision is made as to whether or not any fault or faults exist anywhere in the control system. If a decision is made that no fault exists, then the flow of control passes to the step 340, and if a decision is made that an fault or faults exist, then the flow of control passes next to the step 330.

In the step 330, the fault flag Ff is set to one, and then the flow of control proceeds to the next step 340.

In the step 340, a diagnosis process is effected with respect to the various parts in the control system. If any trouble or troubles such as faults are found, then code numbers showing their positions are indicated on the display panel 232, and if no trouble is found, then the flow of control returns to the step 30 without indicating any code number on the display panel, and thereafter the steps 30 through 340 described above are repeated.

In the step 350, the main relay is turned off to finish the control flow shown in FIG. 3 and to stop supplying electricity to the electric control device 200 shown in FIG. 2.

It is to be noted that the pressure controls conducted by the bypass valve when the system is started and stopped do not form a principal part of the present invention, and references may be made for the details concerning these pressure controls to the Japanese Patent Applications Nos. Showa 63-307189 and Showa 63-307190 which were filed by an applicant the same as the assignee of the present application. As will be realized by those skilled in the art, although each cut-off valve is provided between the associated pressure control valve and the actuator in the mentioned embodiment, it may be incorporated on the opposite side from the actuator relative to the pressure control valve.

Figure 8A:
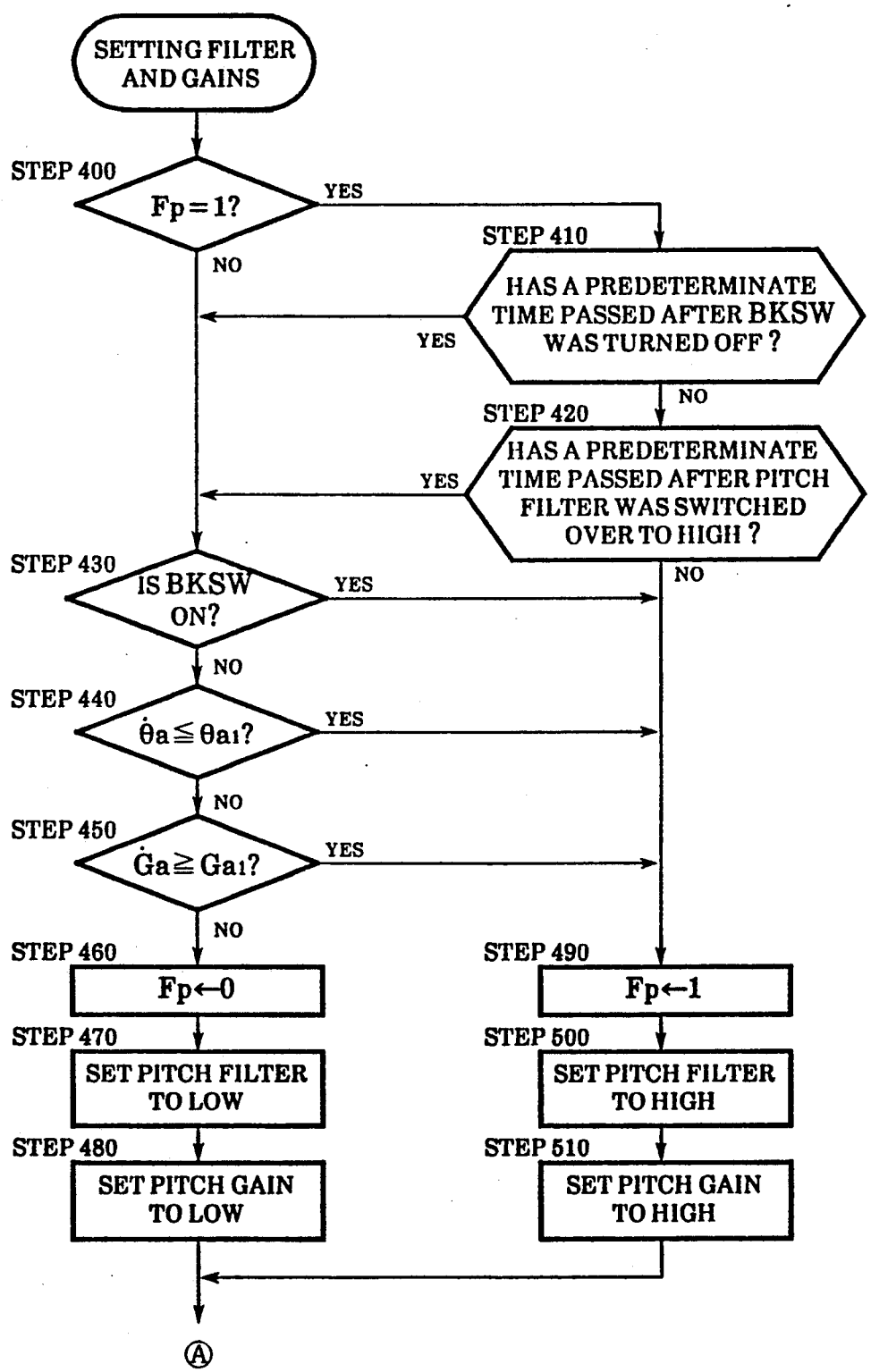
FIGS. 8A through 8C are flow charts showing the subroutine for setting filters and gains performed in the step 35 in the flow chart shown in FIG. 3.
Figure 8B:
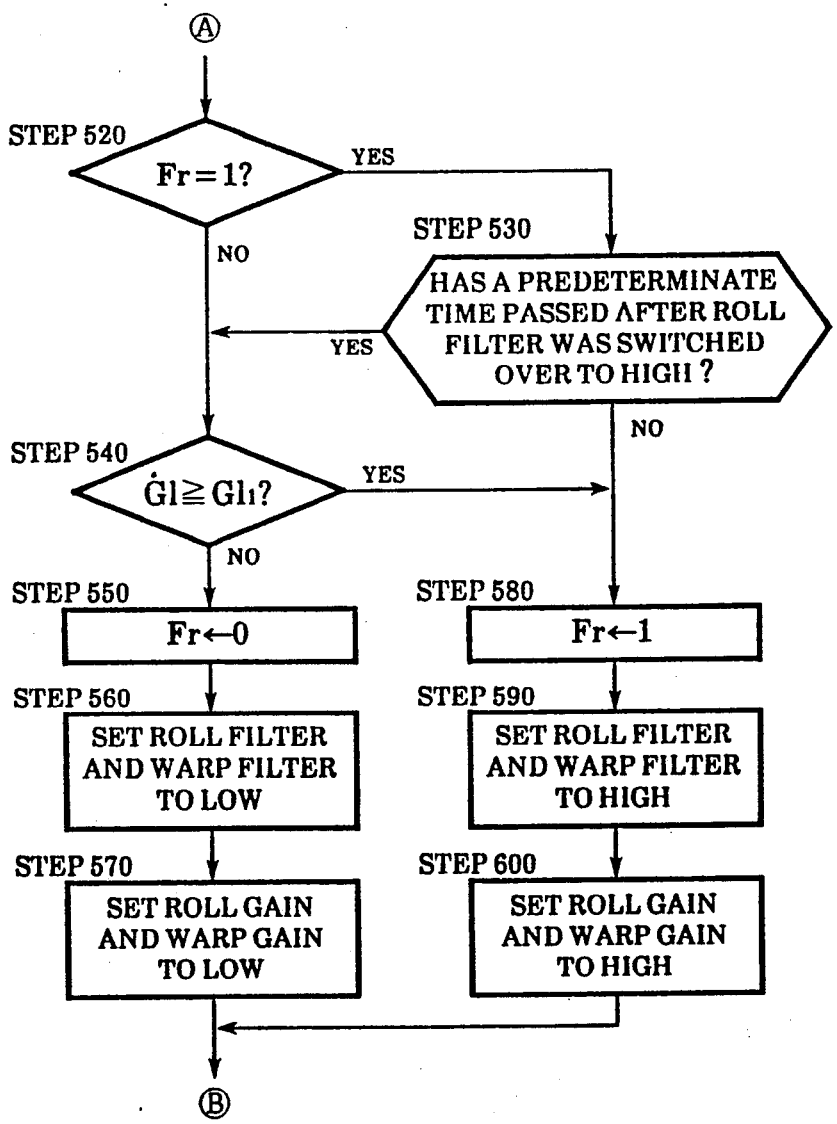
Figure 8C:
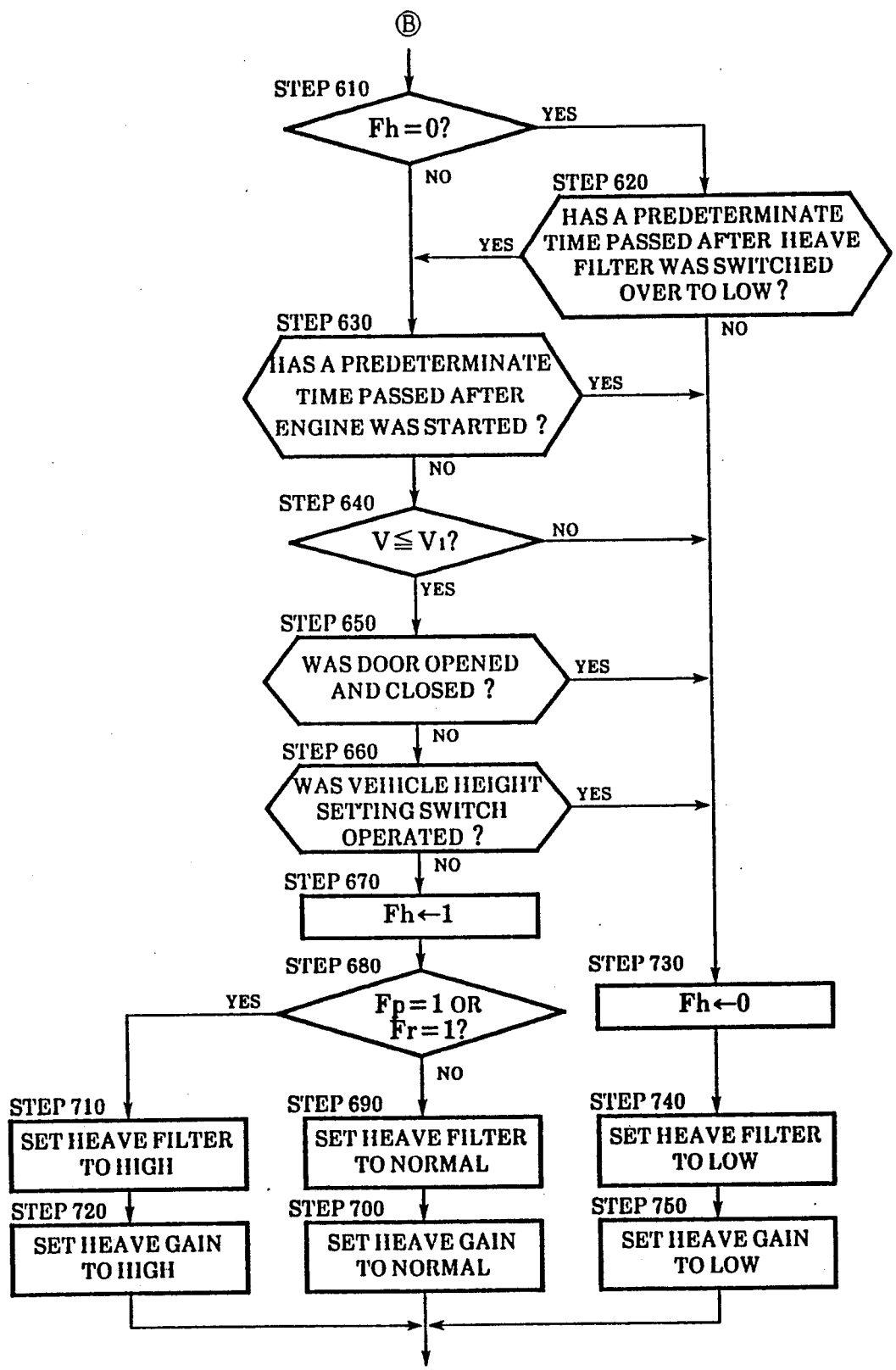
Figure 9B:
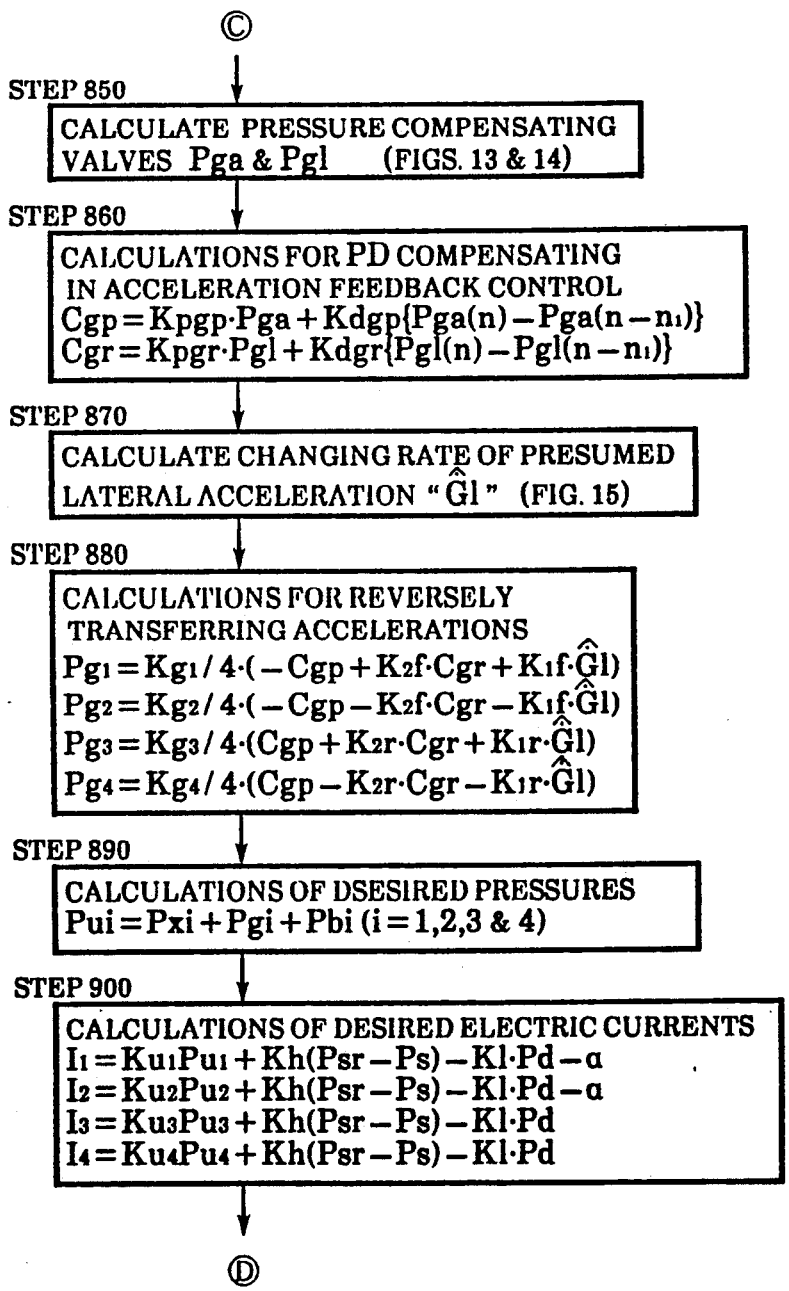
Figure 9C:
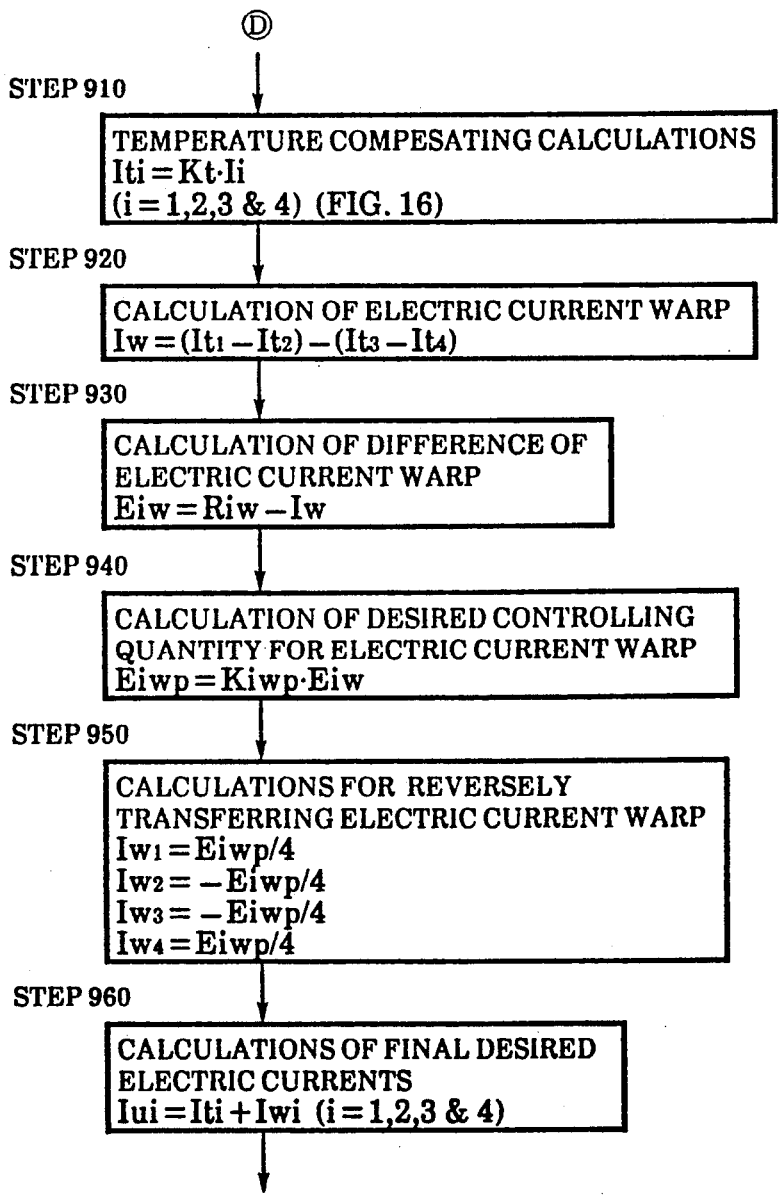

Referring next to FIGS. 8A through 8C, the procedures for setting the filters and the gains carried out in the step 35 will be explained.

It is to be noted that in FIGS. 8A through 8C, a flag Fp concerns with a pitch filter, and one means the pitch filter is set to high level while zero means the pitch filter is set to low level. A flag Fr relates to a roll filter, and one denotes the roll filter is set to high level while zero denotes the roll filter is set to low level. A flag Fh concerns with a heave filter, and one means the heave filter is set to high or normal level while zero means heave filter is set to low level.

In the step 400, a decision is made as to whether or not the flag Fp is one. If a decision is made that the flag Fp is not one, then the flow of control is transferred to the step 430, and if a decision is made that the flag Fp is one, then the flow of control passes next to the step 410.

In the step 410, a decision is made as to whether or not a predeterminate period of time has passed after the brake switch was turned off. If a decision is made that the predeterminate time has passed, then the flow of control is transferred to the next step 430, and if a decision is made that the predeterminate time has not yet passed, then the flow of control passes to the next step 420.

In the step 420, a decision is made as to whether or not a predeterminate period of time has passed after the cut-off frequency for the pitch filter was switched over to the high level. If a decision is made that the predeterminate time has not yet passed, then the flow of control is transferred to the step 490, and if a decision is made that the predeterminate time has passed, then the flow of control proceeds to the next step 430.

In the step 430, a decision is made as to whether or not the brake switch is on. If a decision is made that the brake switch is on, then the flow of control is transferred to the step 490, and if a decision is made that the brake switch is not on, then the flow of control passes next to the step 440.

In the step 440, a decision is made as to whether or not the changing rate $\theta a$ of the throttle opening is equal to or less than a controlling threshold $\theta a1$. If a decision is made that the changing rate is equal to or lower than the threshold, then the flow of control is transferred to the step 490, and if a decision is made that the changing rate is higher than the threshold, then the flow of control proceeds to the next step 450.

In the step 450, a decision is made as to whether or not the changing rate Ga of the longitudinal acceleration is equal to or higher than a controlling threshold Ga. If a decision is made that the changing rate is equal to or higher than the threshold, then the flow of control is transferred to the step 490, and if a decision is made that the changing rate is lower than the threshold, then the flow of control passes next to the step 460.

In the step 460, the flag Fp is set to zero, and then the flow of control proceeds to the next step 470.

In the step 470, the cut-off frequency of the pitch filter is set to the low level, and then the flow of control passes to the next step 480.

In the step 480, the pitch gain Kxp is set to the low level Kxpl, and then the flow of control proceeds to the step 520.

In the step 490, the flag Fp is set to one, and then the flow of control passes next to the step 500.

In the step 500, the cut-off frequency of the pitch filter is set to the high level, and then the flow of control proceeds to the next step 510.

In the step 510, the pitch gain Kxp is set to the high level Kxph, and then the flow of control passes to the next step 520.

In the step 520, a decision is made as to whether or not the flag Fr is one. If a decision is made that the flag Fr is not one, then the flow of control is transferred to the step 540, and if a decision is made that the flag Fr is one, then the flow of control passes next to the step 530.

In the step 530, a decision is made as to whether or not a predeterminate period of time has passed after the cut-off frequency for the roll filter was switched over to the high level. If a decision is made that the predeterminate time has not yet passed, then the flow of control is transferred to the step 580, and if a decision is made that the predeterminate time has passed, then the flow of control proceeds to the next step 540.

In the step 540, a decision is made as to whether or not the changing rate Gl of the lateral acceleration is equal to or higher than a controlling threshold Gl. If a decision is made that the changing rate is equal to or higher than the threshold, then the flow of control is transferred to the step 580, and if a decision is made that the changing rate is lower than the threshold, then the flow of control passes next to the step 550.

In the step 550, the flag Fr is set to zero, and then the flow of control proceeds to the next step 560.

In the step 560, the cut-off frequencies of the roll and warp filters are set to their low levels, and then the flow of control passes to the next step 570.

In the step 570, the roll gain Kxr and the warp gain Kxw are set to their low levels Kxrl and Kxwl, respectively, and then the flow of control proceeds to the next step 610.

In the step 580, the flag Fr is set to one, and then the flow of control passes next to the step 590.

In the step 590, the cut-off frequencies of the roll end warp filters are set to their high levels, and then the flow of control proceeds to the next step 600.

In the step 600, the roll gain Kxr and the warp gain Kxw are set to their high levels Kxrh and Kxwh, respectively, and then the flow of control passes to the next step 610.

In the step 610, a decision is made as to whether or not the flag Fh is zero. If a decision is made that the flag Fh is not zero, then the flow of control is transferred to the step 630, and if a decision is made that the flag Fh is zero, then the flow of control passes next to the step 620.

In the step 620, a decision is made as to whether or not a predeterminate period of time has passed after the cut-off frequency for the heave filter was switched over to the low level. If a decision is made that the predeterminate time has not yet passed, then the flow of control is transferred to the 730, and if a decision is made that the predeterminate time has passed, then the flow of control proceeds to the next step 630.

In the step 630, a decision is made as to whether or not a predeterminate time of period has passed after the engine was started. If a decision is made that the predeterminate time has passed, then the flow of control is transferred to the next step 730, and if a decision is made that the predeterminate time has not yet passed, then the flow of control passes to the next step 640.

In the step 640, a decision is made as to whether or not the vehicle speed V is equal to or lower than a controlling threshold V1. If a decision is made that the vehicle speed V is higher than the threshold V1, then the flow of control is transferred to the step 730, and if a decision is made that the vehicle speed is equal to or lower than the threshold, then the flow of control passes next to the step 650.

In the step 650, a decision is made as to whether or not any door was opened and then closed, i.e., whether or not any door switch was switched over from off to on and thereafter from on to off. If a decision is made that any door was opened and closed, then the flow of control is transferred to the step 730, and if a decision is made that no door was opened and closed, then the flow of control proceeds to the next step 660.

In the step 660, a decision is made as to whether or not the vehicle height setting switch was operated. If a decision is made that the vehicle height setting switch was operated, then the flow of control is transferred to the step 730, and if a decision is made that the switch was not operated, then the flow of control passes next to the step 670.

In the step 670, the flag Fh is set to one, and then the flow of control proceeds to the next step 680.

In the step 680, a decision is made as to whether or not any of the flags Fp and Fr is one. If a decision is made that one of the flags or both of the flags are one, then the flow of control is transferred to the step 710, and if a decision is made that neither of the flag is one, then the flow of control passes next to the step 690.

In the step 690, the cut-off frequency of the heave filter is set to the normal level, and then the flow of control passes to the next step 700.

In the step 700, the heave gain Kxh is set to the normal level Kxhn, and then the flow of control proceeds to the step 40 in the flow chart shown in FIG. 3.

In the step 710, the cut-off frequency of the heave filter is set to the high level, and then the flow of control passes next to the step 720.

In the step 720, the heave gain kxh is set to the high level Kxhh, and then the flow of control proceeds to the step 40.

In the step 730, the flag Fh is set to zero, and then the flow of control passes to the next step 740.

In the step 740, the cut-off frequency of the heave filter is set to the low level, and then the flow of control passes to the next step 750.

In the step 750, the heave gain Kxh is set to the low level Kxhl, and then the flow of control proceeds to the step 40.

Thus, in the step 400 through 510 shown in FIG. 8A, the pitch gain and the cut-off frequency of the pitch filter are set to their high levels when a relatively large inertial force acts on the vehicle body in the longitudinal direction. In the step 520 through 600 shown in FIG. 8B, the roll and warp gains are set to their high levels and the cut-off frequencies of the roll and warp filters are set to their high levels when a relatively large inertial force acts on the vehicle body in the lateral direction. In the steps 610 through 750 shown in FIG. 8C, the heave gain and the cut-off frequency of the heave filter are changed in response to the possibility of the vertical displacement of the vehicle body. It is to be noted that the gains set in the step 400 through 750, i.e., in the step 35 are so set that they may always have the following relationships.

$$Kxr > Kxw$$

$$Kxp > Kxw$$

In this connection, Kxr and Kxp may be equal to each other, and, additionally, they may be so set that they may always have the following relationships.

$$Kxr = Kxp > Kxh > Kxw$$

The cut-off frequencies Fcr, Fcp and Fcw of the low-pass filters for roll, pitch and heave, respectively, set in the steps 400 through 750 are so set that they may always have the following relationships.

Fcr of the roll filter > Fcw of the warp filter
Fcp of the pitch filter > Fcw of the warp filter The cut-off frequencies of the filters may, for example, be set to the following values or the values within the following rages (unit: Hz).

|       | High | Normal | Low   |
|-------|------|--------|-------|
| Heave | 1-3  | 5      | 10    |
| Pitch | 3-6  | —      | 10-15 |
| Roll  | 3-6  | —      | 10-15 |

|      | High    | Normal | Low |
|------|---------|--------|-----|
| Warp | 0.01-1  | —      | 2   |

Referring next to the FIGS. 9A through 9C and FIGS. 10 through 16, the calculations for the active control conducted in the above-mentioned step 150 will be explained.

Figure 10:
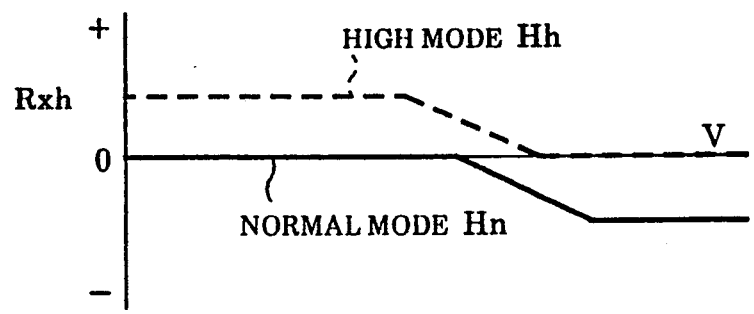
FIG. 10 is a graph showing the relationship between a vehicle speed V and a desired displacement Rxh of heave.
Figure 11:
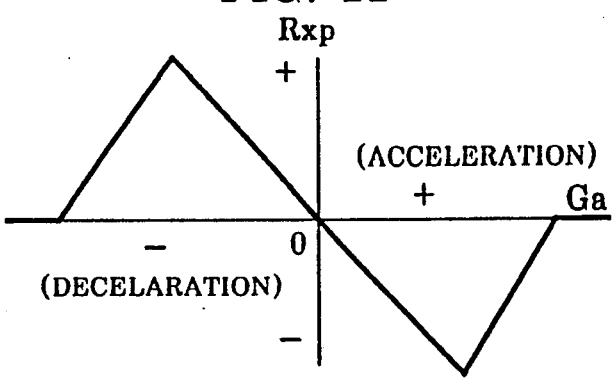
FIG. 11 is a graph showing the relationship between a longitudinal acceleration Ga and a desired displacement Rxp of pitch.
Figure 12:
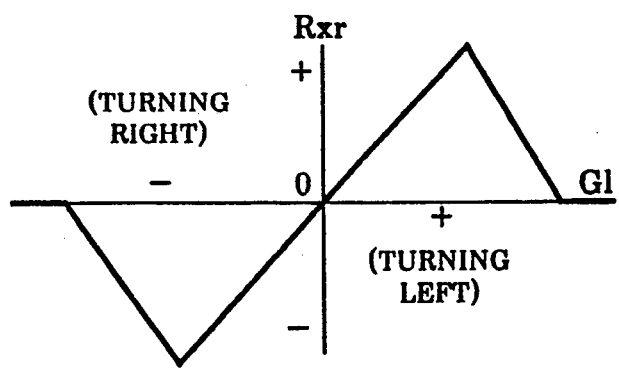
FIG. 12 is a graph showing the relationship between a lateral acceleration Gl and a desired displacement Rxr of roll.

In the step 800, based upon the maps corresponding to the graphs shown in FIGS. 10 through 12, desired displacement values Rxh, Rxp and Rxr of heave, pitch and roll, respectively, for attaining a desired attitude of the vehicle body are calculated, and then the flow of control passes next to the step 810.

It is to be noted that in FIG. 10, the solid line shows a pattern wherein the mode for controlling vehicle heights set by the vehicle height setting switch is the normal mode and the dotted line shows a pattern wherein the mode is the high mode.

In the step 810, based upon the vehicle heights X1, X2, X3 and X4 at the locations corresponding to the front left, front right, rear left, and rear right vehicle wheels read in the step 30, calculations for transferring the displacements into values of heave "Xxh", pitch "Xxp", roll "Xxr" and warp "Xxw" are carried out according to the following equations, and thereafter the flow of control passes next to the step 815.

$$Xxh = (X1+X2)+(X3+X4)$$

$$Xxp = -(X1+X2)+(X3+X4)$$

$$Xxr = (X1-X2)+(X3-X4)$$

$$Xxw = (X1-X2)-(X3-X4)$$

In the step 815, the signals indicative of the values of heave, pitch, roll and warp calculated in the step 810 are processed with the low-pass filters set in the step 35 to calculate the filtered values $\overline{Xxh}$, $\overline{Xxp}$, $\overline{XXr}$ and $\overline{Xxw}$ of heave, pitch, roll and warp, respectively, and then the flow of control proceeds to the next step 20.

In the step 820, the differences of the displacements of the respective modes are calculated according to the following equations, and next step 20.

In the step 820, the differences of the displacements of the respective modes are calculated according to the following equations, and next the flow of control passes to the step 830.

$$Exh = Rxh - Xxh$$

$$Exp = Rxp - Xxp$$

$$Exr = Rxr - Xxr$$

$$Exw = Rxw - Xxw$$

In this connection, Rxw may be zero, or Xxw calculated in the step 810 just after the control system has been started to operate or the average value of Xxws calculated in the last few cycles. If the absolute value of Exw is equal to or less than W1 which is a positive constant, Exw is then set to zero.

In the step 830, based upon the gains Kxh, Kxp, Kxr and Kxw set in the step 35, calculations for PID compensations in displacement feedback controls are conducted according to the following equations, and thereafter the flow of control passes next to the step 460.

$$Cxh = Kxh\{Kpxh \cdot Exh + Kixh \cdot Ixh(n) + Kdxh\{Exh(n)-Exh(n-n1)\}\}$$

$$Cxp = Kxp\{Kpxp \cdot Exp + Kixp \cdot Ixp(n) + Kdxp\{Exp(n)-Exp(n-n1)\}\}$$

$$Cxr = Kxr\{Kpxr \cdot Exr + Kixr \cdot Ixr(n) + Kdxr\{Exr(n)-Exr(n-n1)\}\}$$

$$Cxw = Kxw\{Kpxw \cdot Exw + Kixw \cdot Ixw(n) + Kdxw\{Exw(n)-Exw(n-n1)\}\}$$

It should be noted that in the above equations, Ej(n) (j = xh, xp, xr and xw) are the present values of Ej, and Ej(n−n1) are values of Ej obtained n1 cycles before. Assuming Ij(n) and Ij(n−1) are values of Ij of the present cycle and one cycle before, respectively, and Tx is a time constant, they have the following relationship.

$$Ij(n) = Ej(n) + Tx \cdot Ij(n-1)$$

If the absolute values of Ij exceed Ijmax which are predetermined values, then Ij are set to Ijmax. Further, the gains Kpj, Kij, Kdj (j = xh, xp, xr and xw) are proportional constants, integral constants and differential constants, respectively.

In the step 840, calculations for reversely transferring the displacement modes are carried out according to the following equations, and then the flow of control proceeds to the step 850.

$$Px1 = \tfrac{1}{4} \cdot Kx1(Cxh - Cxp + Cxr + Cxw)$$

$$Px2 = \tfrac{1}{4} \cdot Kx2(Cxh - Csp - Cxr - Cxw)$$

$$Px3 = \tfrac{1}{4} \cdot Kx3(Cxh + Cxp + Cxr - Cxw)$$

$$Px4 = \tfrac{1}{4} \cdot Kx4(Cxh + Cxp - Cxr + Cxw)$$

where Kx1, Kx2, Kx3 and Kx4 are proportional constants.

Figure 13:
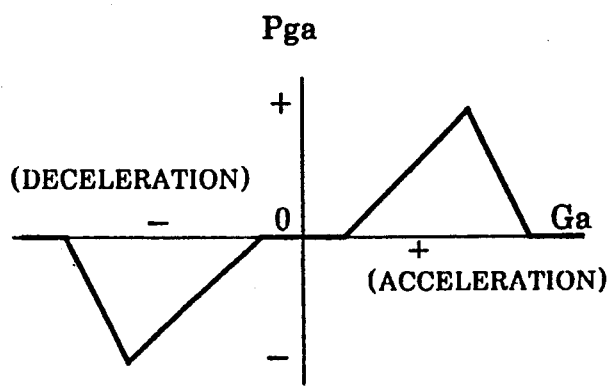
FIG. 13 is a graph showing the relationship between a longitudinal acceleration Ga and a pressure compensating value Pga.
Figure 14:
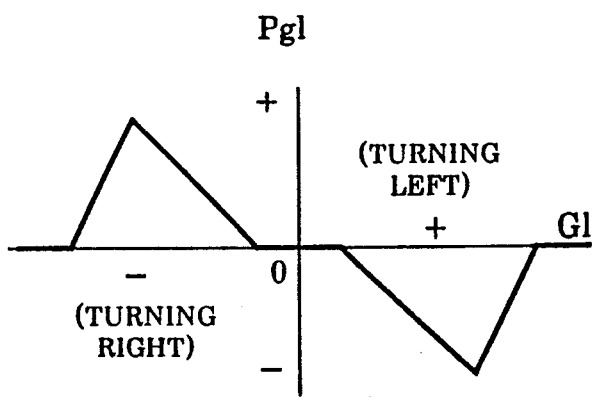
FIG. 14 is a graph showing the relationship between a lateral acceleration Gl and a pressure compensating value Pgl.

In the step 850, based upon the maps corresponding to the graphs shown in FIGS. 13 and 14, pressure compensating values Pga and Pgl in the longitudinal and lateral directions, respectively, are calculated, and then the flow of control passes next to the step 860.

In the step 860, calculations for PD compensations on pitch (Cgp) and roll (Cgr) in acceleration feedback control are conducted according to the following equations, and thereafter the flow of control proceeds to the next step 870.

$$Cgp = Kpgp \cdot Pga + Kdgp\{Pga(n) - Pga(n-n1)\}$$

$$Cgr = Kpgr \cdot Pgl + Kdgr\{Pgl(n) - Pgl(n-n1)\}$$

In the equations, Pga(n) and Pgl(n) are present Pga and Pgl, respectively, and Pga(n−n1) and Pgl(n−n1) are Pga and Pgl, respectively, at the cycle which is n1 cycles before, Kdgp and Kdgr are the proportional constants, while Kdgp and Kdgr are the differential constants.

Figure 15:
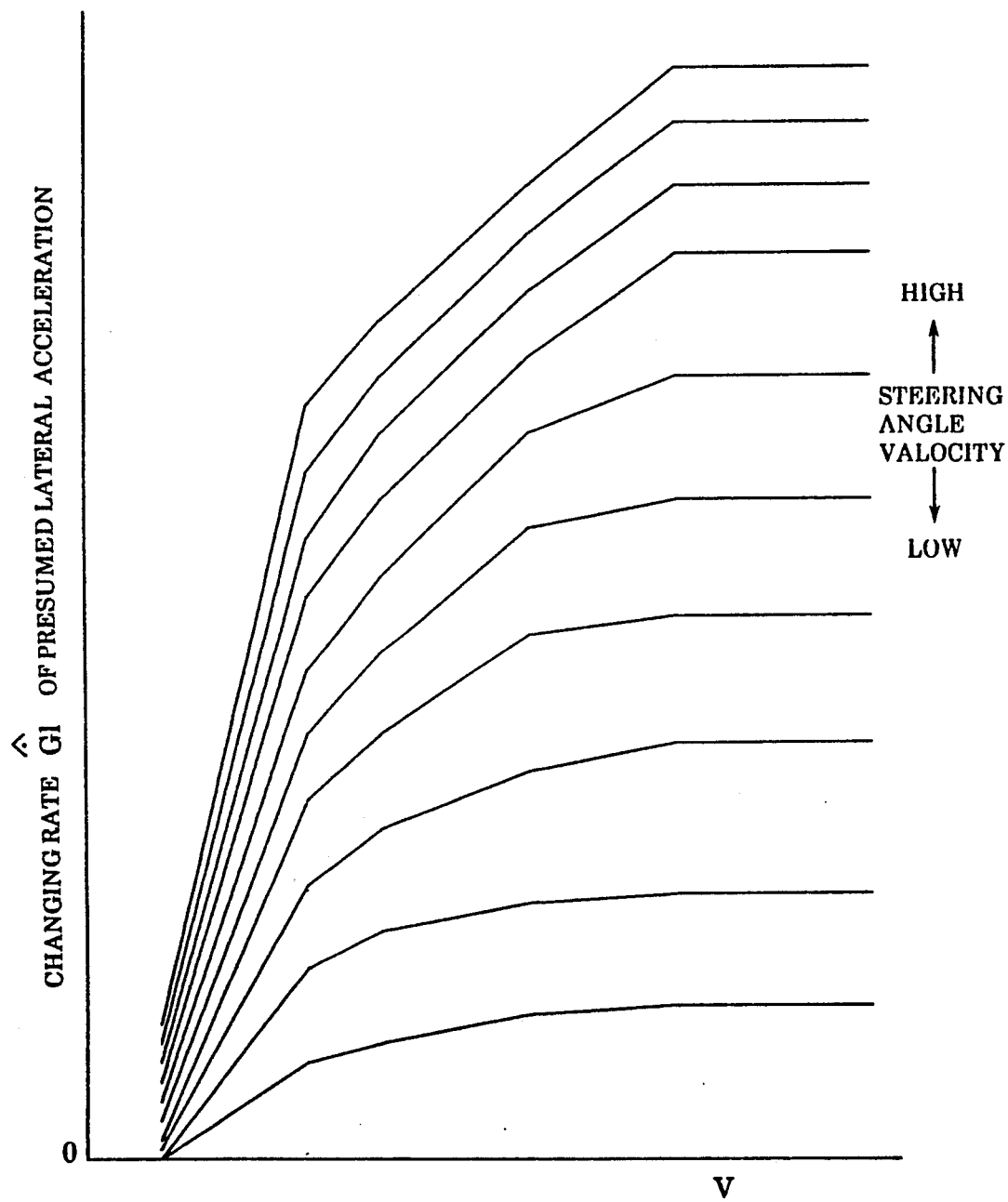
FIG. 15 is a graph showing the relationship between a vehicle speed V, a steering angle velocity and the changing rate Gl of a presumed lateral acceleration.

In the step 870, letting $\theta'$ represent a steering angle read in the step 30 one cycle before in the flow chart shown in FIG. 3, steering angle velocity $\dot\theta$ is calculated according to the following equation:

$$\dot\theta = \theta - \theta'$$

and based upon the map corresponding to the graph shown in FIG. 15 and from the steering angle velocity calculated above and a vehicle speed V, the changing rate of the presumed lateral acceleration "Gl" is calculated, and thereafter the flow of control passes next to the step 880.

In the step 880, calculations for reversely transferring acceleration modes are performed according to the following equations, and next the flow of control proceeds to the step 890.

$$Pg1 = Kg1/4 \cdot (-Cgp + K2f \cdot Cgr + K1f \cdot \hat{Gl})$$

$$Pg2 = Kg2/4 \cdot (-cgp - K2f \cdot Cgr - K1f \cdot \hat{Gl})$$

$$Pg3 = Kg3/4 \cdot (Cgp + K2r \cdot Cgr + K1r \cdot \hat{Gl})$$

$$Pg4 = Kg4/4 \cdot (Cgp - K2r \cdot Cgr - K1r \cdot \hat{Gl})$$

In the equations Kg1, Kg2, Kg3 and Kg4 are proportional constants, and K1f, K1r, K2f and K2r are constants serving as distributing gains between front and rear vehicle wheels.

In the step 890, based upon the pressures Pbi stored in RAM 208 in the step 200 and the calculated values obtained in the steps 840 and 880, desired controlling pressures Pui of the pressure control valves are calculated according to the following equations, and thereafter the flow of control proceeds of the step 900.

$$Pui = Pxi + Pgi + Pbi (i = 1, 2, 3 \text{ and } 4)$$

In the step 900, desired electric currents supplied to the pressure control valves are calculated according to the following equations, and then the flow of control pases next to the step 910.

$$I1 = Ku1 \cdot Pu1 + Kh(Psr - Ps) - Kl \cdot Pd - alpha$$

$$I2 = Ku2 \cdot Pu2 + Kh(Psr - Ps) - Kl \cdot Pd - alpha$$

$$I3 = Ku3 \cdot Pu3 + Kh(Psr - Ps) - Kl \cdot Pd$$

It is to be noted that Ku1, Ku2, Ku3, Ku4 are proportional constants for corresponding vehicle wheels; Kh and Kl are compensating coefficients for pressures within the high pressure and the low pressure flow lines, respectively; alpha is a compensating constant between the front and rear vehicle wheels; and Psr is a standard pressure within the high pressure flow line.

Figure 16:
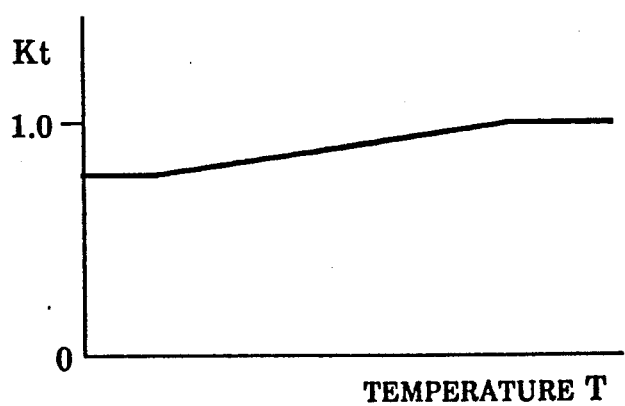
FIG. 16 is a graph showing the relationship between the temperature T of oil and a compensating coefficient Kt.

In the step 910, based upon the temperature T of the oil read in the step 30 and the map corresponding to the graph shown in FIG. 16, a coefficient Kt for compensating for temperature is calculated; the calculations for compensating the desired electric currents for temperature are effected according to the following equations; and then the flow of control passes next to the step 920.

$$Iti = Kt \cdot Ii \ (i = 1, 2, 3 \text{ and } 4)$$

In the step 920, an electric current warp, i.e., a warp of the electric current values about the longitudinal axis of the vehicle body, is calculated according to the following equation, and then thereafter the flow of control proceeds to the step 930.

$$Iw = (It1 - It2) - (Ita - It4)$$

In the step 930, letting Riw denote a desired electric current warp, a difference of the electric current warp is calculated according to the following equation, and next the flow of control proceeds to the step 940.

$$Eiw = Riw - Iw$$

In the above equation the desired electric current warp Riw may be zero.

In the step 940, letting Kiwp represent a proportional constant, a desired controlling value of the electric current warp is calculated according to the following equation, and then the flow of control passes to the next step 950.

$$Eiwp = Kiwp \cdot Eiw$$

In the step 950, calculations for reversely transferring the electric current warp are carried out according to the following equations, and thereafter the flow of control is transferred to the next step 960.

$$Iw1 = Eiwp / 4$$

$$Iw2 = -Eiwp / 4$$

$$Iw3 = -Eiwp / 4$$

$$Iw4 = Eiwp / 4$$

In the step 960, based upon the values obtained by the calculations conducted in the steps 910 and 950, final desired electric currents Iui supplied to the pressure control valves are calculated according to the following equations, and then the flow of control is transferred next to the step 290 shown in FIG. 3.

$$Iui = Iti + Iwi (i = 1, 2, 3 \text{ and } 4)$$

Thus, according to this embodiment, since the gains and the cut-off frequencies of the low-pass filters are set as above for the four modes, the degrees of the low and pitch differences are higher than the degree of warp difference in contributing to the determination of the desired controlling pressures of the pressure control valves. Therefore, the feed-back control is effectively conducted based upon the roll and pitch differences while the effect of the feed-back control based upon the warp difference is reduced, which enables to enhance the comfortability of the vehicle while effectively reducing roll and pitch of the vehicle body as compared with the suspension system in which the feed-back control of vehicle height is carried out separately for each vehicle wheel.

Additionally, according to this embodiment, since the gains and the filters are changed in accordance with the conditions of the vehicle such as the running conditions, the possibility of the vertical displacement of the vehicle body or the like, the degrees of the differences in contributing to the determination of the desired controlling pressures of the pressure control valves are desirably set according to the conditions of the vehicle, which allows to enhance the comfortability of the vehicle in a more preferable manner while more desirably performing the control of the attitude of the vehicle body in comparison with the system in which the gains and the filters are not changed according to the conditions of the vehicle.

FIGS. 17A through 17C and FIGS. 18A through 18C are flow charts showing the routine for setting the filters and the gains and the routine for conducting calculations for the active control, respectively, in another preferred embodiment of the active suspension system of the present invention, and corresponding to the flow charts shown in FIGS. 8A through 8C and FIGS. 9A through 9C, respectively.

It is to be noted that in FIGS. 17A through 17C and FIGS. 18A through 18C, the steps corresponding to those shown in FIGS. 8A through 8C and FIGS. 9A through gC are indicated by the same step numbers as in the flow charts shown in FIGS. 8A through 8C and FIGS. 9A through 9C.

As will be realized from comparing the figures with each other, the controlling flow in this embodiment is the same as in the embodiment shown in FIGS. 1 through 16 except that the routines conducted in the steps 35 and 150 in the flow chart shown in FIG. 3 are carried out in accordance with the routines shown in FIGS. 17A 17C and FIGS. 18A through 18C, respectively.

Figure 17A:
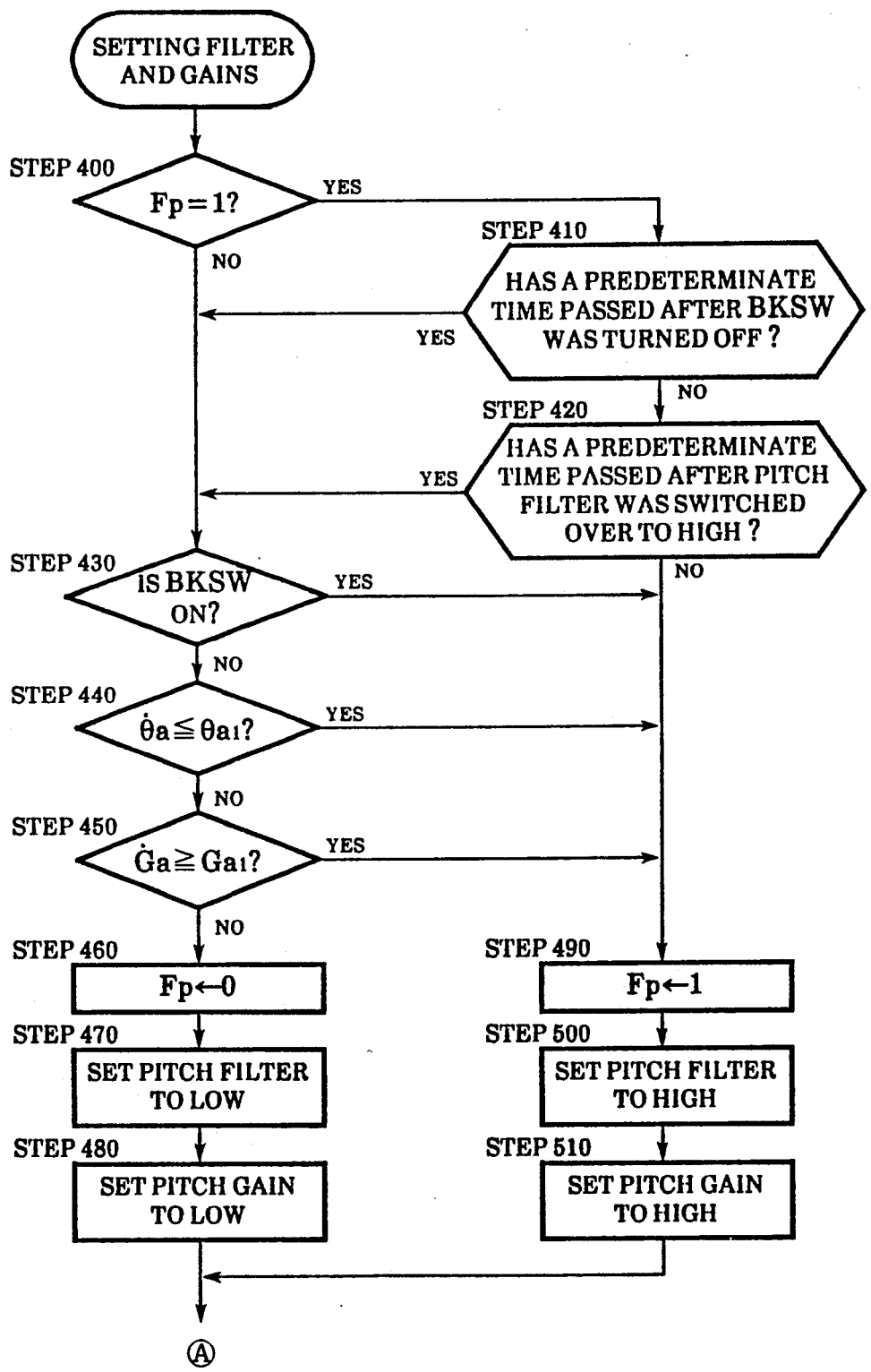
FIGS. 17A through 17C and FIGS. 18A through 18C are flow charts showing the subroutine for setting filters and gains and the subroutine of the calculations for the active control in another preferred embodiment of the active suspension system according to the present invention.
Figure 17B:
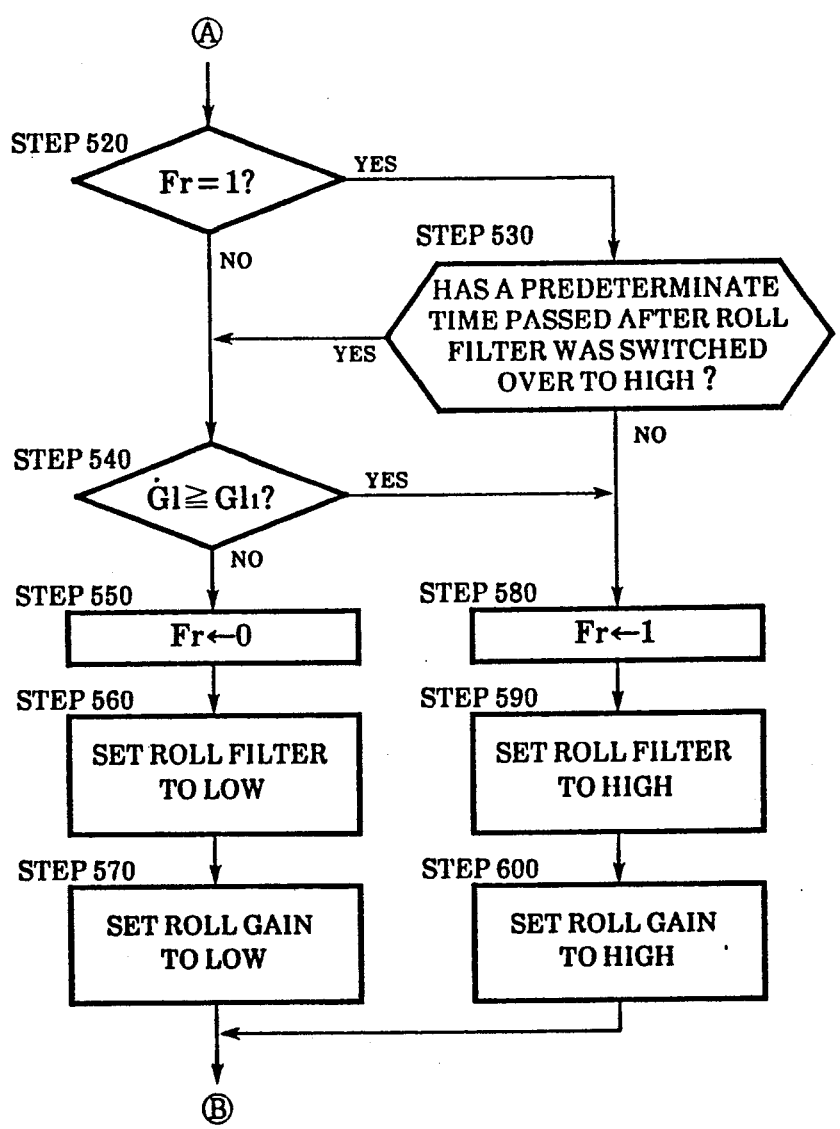
Figure 17C:
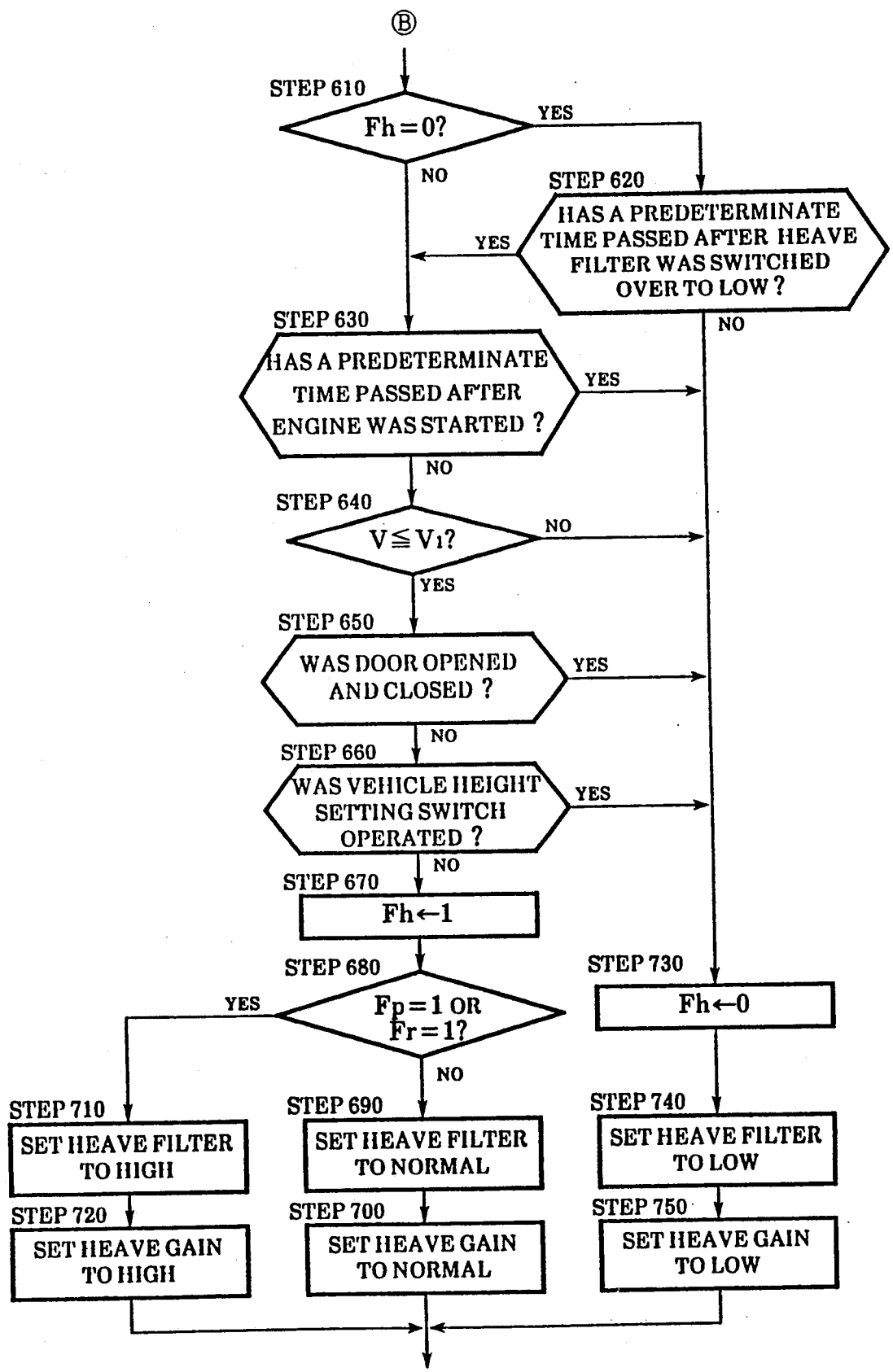
Figure 18A:
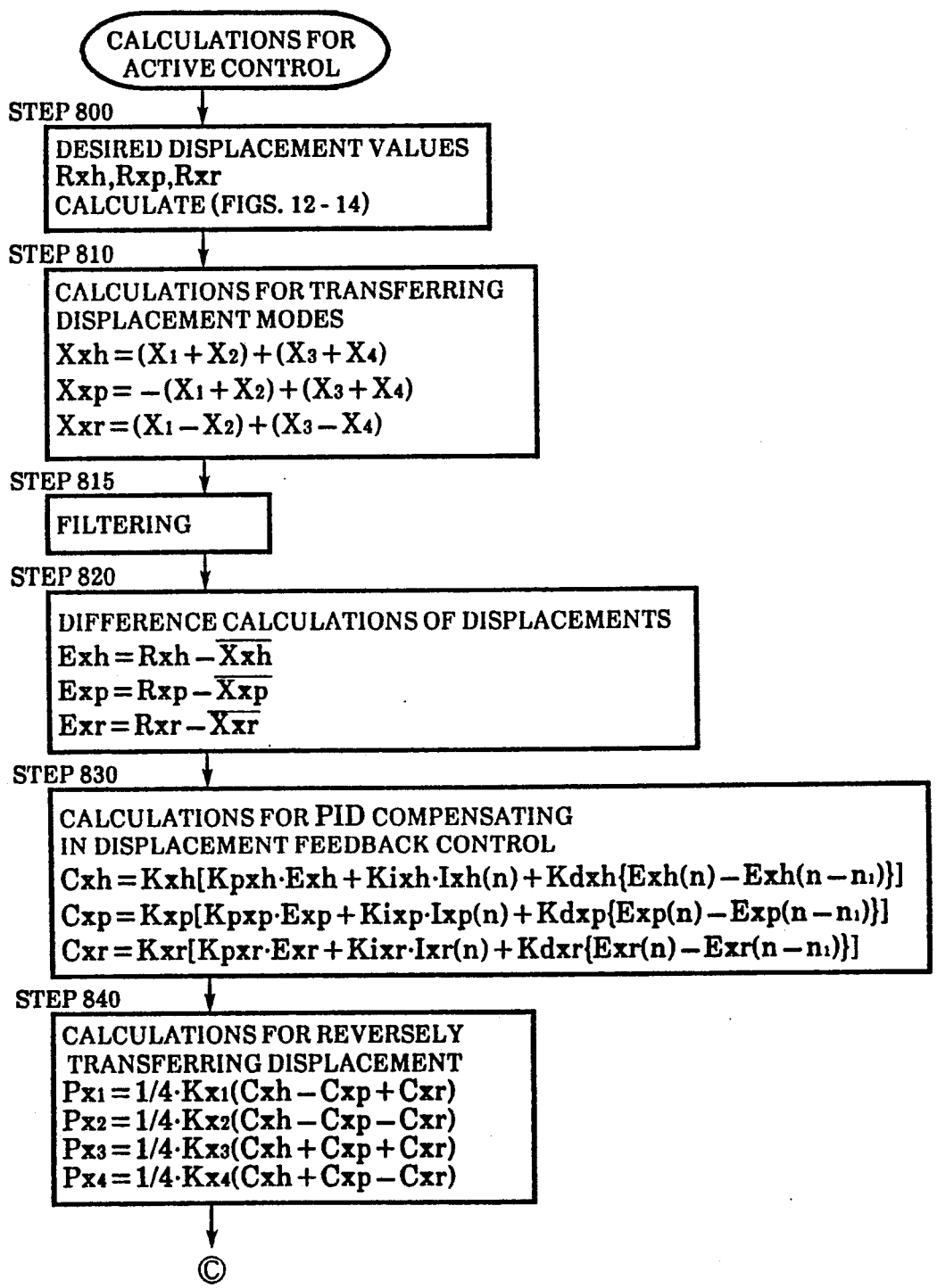
Figure 18B:
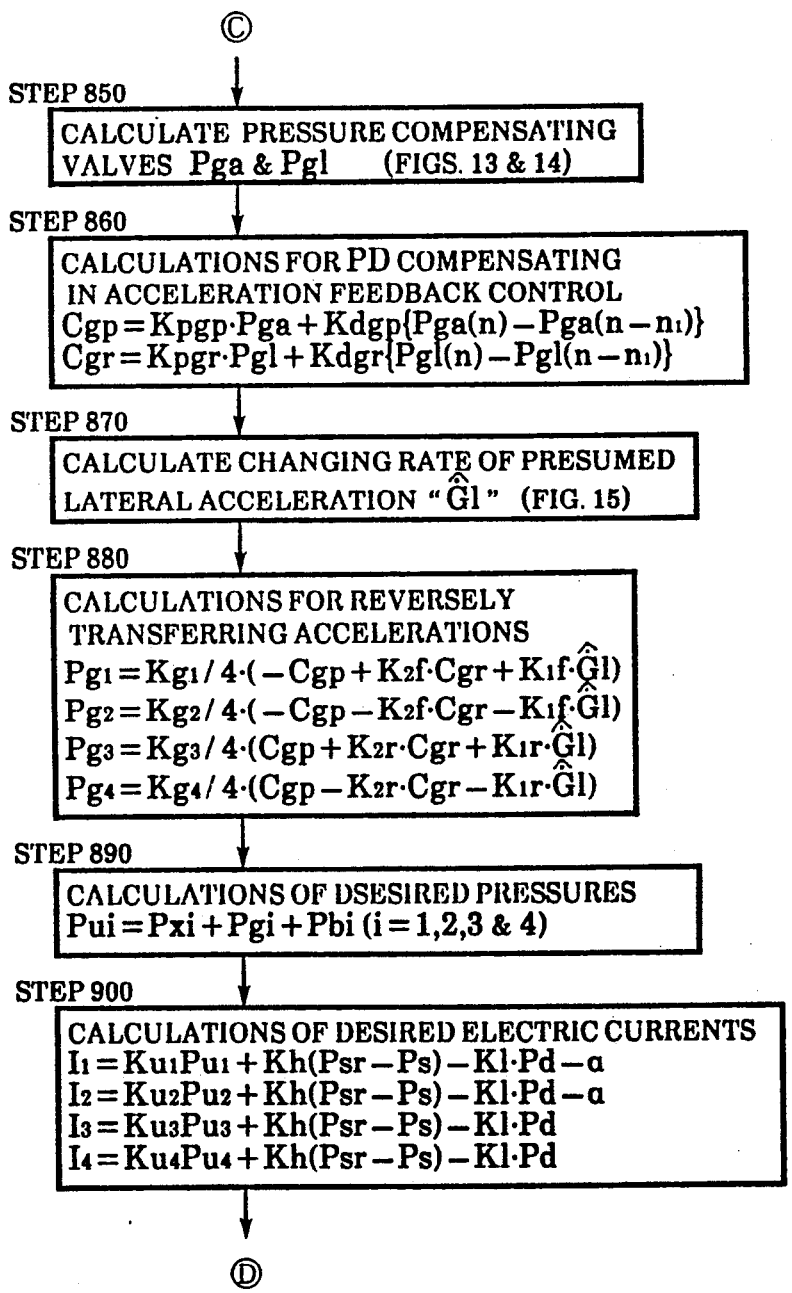
Figure 18C:
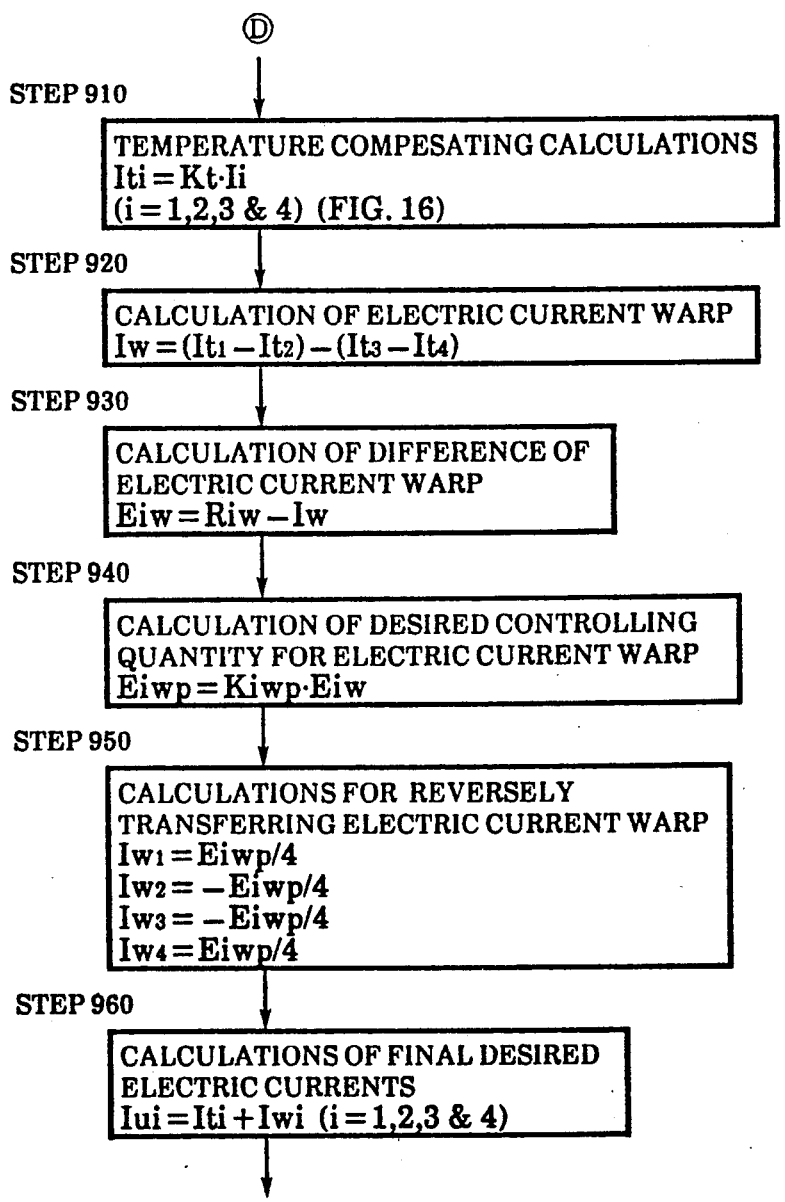

In this embodiment, as is apparent from the figures, warp filter is not set in the steps 560 and 590 shown in FIG. 17B and the warp gain is not set in the steps 570 and 600. The value Xxw of warp is not calculated in the step 810 shown in FIG. 18A and the filtering is not conducted on the signal indicative of the value Xxw of warp in the step 815. Accordingly, the differences are calculated only for heave, pitch and roll in the step 820 and the PID compensating values Cxh, Cxp and Cxr for displacement feedback controls are calculated only for heave, pitch and roll in the step 830, the calculations for reversely transferring the displacement mode being carried out based upon these three compensating values in the step 840.

According to this embodiment, therefore, since the feedback control is not effected based upon the warp difference, the comfortability of the vehicle can be enhanced to the extent corresponding to no feedback control being carried out based upon the warp difference while the attitude change of the vehicle body such as roll and pitch being effectively reduced.

According to this embodiment also, since the gains and filters for roll, pitch and heave are set in accordance with the conditions of the vehicle, their degrees of the differences of these modes in contributing to the determination of the desired controlling pressures of the pressure control valves are desirably set according to the conditions of the vehicle, so that, as compared with the system in which the gains and the filters are not changed, the comfortability of the vehicle can be enhanced in a more preferable manner while the control of the attitude of the vehicle body being more desirably performed.

While in either of the embodiments referred to above, the gains Kxh, Kxp, and Kxr (and Kxw) which serve as coefficient for all the terms in each equation in the step 830 are set in the step 400 through 750, the coefficients for all the terms in each equation in the step 830 may be omitted and the gains for respective terms such as Kpxh, Kixh and Kdxh may be set individually.

While in either of the embodiments mentioned above, both the gains and the filters are set in the steps 400 through 750, either of the gains and the filters may solely be set as desired. Although the present invention has been shown and described in detail in terms of particular preferred embodiments, the present invention is not restricted to the embodiments, and it will be seen by those skilled in the relevant art the various modifications may be made without departing from the scope of the present invention.

What is claimed is:

1. A hydraulic active suspension system for a vehicle having a vehicle body and vehicle wheels comprising:
   a plurality of actuators provided between said vehicle body and said associated vehicle wheels for increasing and decreasing vehicle heights in response to control of hydraulic pressures within their working fluid chambers;
   a means for controlling the hydraulic pressures within said working fluid chambers to their desired pressures;
   means for detecting vehicle heights at the locations corresponding to said vehicle wheels; and
   a means for calculating the actual values of roll, pitch, heave and warp of said vehicle body from the vehicle heights detected by said detecting means and calculating the differences between si actual values and the associated values of roll, pitch, heave and warp determined by a desired attitude of said vehicle body to compute the desire pressures for said actuators,
   wherein said computing means weights the degrees of differences from one of a group consisting of the roll difference, the pitch difference and both the roll and pitch differences higher than that of the warp difference in contributing to the computation of the desired pressures.

2. A hydraulic active suspension system for a vehicle according to claim 1, wherein the desired pressures are computed as direct proportional to the roll, pitch, heave and warp differences and the proportional constant for one of a sub-group consisting of the roll difference and the pitch difference is set to be higher than that for the warp difference.

3. A hydraulic active suspension system for a vehicle according to claim 1, wherein the desired pressures are computed as direct proportional to the roll, pitch, heave and warp differences and the proportional constants both for the roll and pitch differences are set to be higher than that for the warp difference.

4. A hydraulic active suspension system for a vehicle according to claim 1, wherein said computing means processes the roll, pitch, heave and warp differences with associated low-pass filters, and the cut-off frequency of the filter for said one from the sub-group consisting of the roll difference and the pitch difference is set to be higher than that of the filter for said warp difference.

5. A hydraulic active suspension system for a vehicle according to claim 1, wherein said computing means is adapted to process the roll, pitch, heave and warp differences with associated low-pass filters, and the cut-off frequencies of the filters both for said roll and pitch differences are set to be higher than that of the filter for said warp difference.

* * * * *